United States Patent
Zhao et al.

(10) Patent No.: US 11,136,916 B1
(45) Date of Patent: Oct. 5, 2021

(54) DIRECT TORQUE CONTROL, PISTON ENGINE

(71) Applicant: CANADAVFD CORP (LTD), Ottawa (CA)

(72) Inventors: Lin Zhao, Ottawa (CA); Defang Yuan, Ottawa (CA)

( * ) Notice: Subject to any disclaimer, the term of this patent is extended or adjusted under 35 U.S.C. 154(b) by 0 days.

(21) Appl. No.: 17/064,051

(22) Filed: Oct. 6, 2020

(51) Int. Cl.
| | |
|---|---|
| F02B 75/28 | (2006.01) |
| F02B 19/06 | (2006.01) |
| F02D 41/00 | (2006.01) |
| F02B 75/04 | (2006.01) |
| F02B 75/02 | (2006.01) |
| F02D 15/04 | (2006.01) |
| F02D 15/00 | (2006.01) |

(52) U.S. Cl.
CPC .............. *F02B 75/28* (2013.01); *F02B 19/06* (2013.01); *F02B 75/042* (2013.01); *F02D 41/0007* (2013.01); *F02B 2075/025* (2013.01); *F02D 15/00* (2013.01); *F02D 15/04* (2013.01); *F02D 2700/03* (2013.01)

(58) Field of Classification Search
CPC ........................................................ F02B 75/28
See application file for complete search history.

(56) References Cited

U.S. PATENT DOCUMENTS

| | | | | | |
|---|---|---|---|---|---|
| 741,824 | A | * | 10/1903 | Pehrsson ................ | F02B 75/042 123/48 A |
| 851,176 | A | * | 4/1907 | Lippincott ............ | F02B 75/044 123/78 R |
| 1,075,307 | A | * | 10/1913 | Shively ................. | F02B 75/042 123/78 A |
| 1,557,710 | A | * | 10/1925 | Lennon .................. | F02B 75/28 123/78 A |
| 1,564,009 | A | * | 12/1925 | Myers .................... | F01L 5/045 123/78 A |
| 1,707,005 | A | * | 3/1929 | Hall ....................... | F01L 5/045 123/47 R |
| 1,812,983 | A | * | 7/1931 | Redmond ............. | F02B 75/042 123/78 AA |
| 2,142,466 | A | * | 1/1939 | Wagner .................. | F02B 75/38 123/48 A |
| 2,260,982 | A | * | 10/1941 | Walker ................... | F02D 15/04 123/78 AA |
| 2,382,362 | A | * | 8/1945 | Weinreb ................ | F02B 75/28 123/78 D |
| 2,445,148 | A | * | 7/1948 | Minnix .................. | F01L 1/44 123/66 |
| 2,769,433 | A | * | 11/1956 | Humphreys ........... | F02D 15/04 123/48 AA |
| 3,312,206 | A | * | 4/1967 | Radovic ................. | F01B 7/02 123/78 D |

(Continued)

*Primary Examiner* — Kevin R Steckbauer

(57) ABSTRACT

A piston engine is provided; the piston engine has a cylinder, a main piston and an auxiliary piston, a combustion chamber is formed between the main piston and the auxiliary piston within the cylinder, the auxiliary piston moves in different frequency along it centerline, a plateau is formed near TDC position of the combustion chamber volume V, there is a preferable PPP in each configuration of the piston, when the combustion peak pressure is at the position of preferable PPP position, the best torque is achieved. Different piston configurations, different ignition timings, dynamic energy recovery and storage are also provided in the invention.

18 Claims, 16 Drawing Sheets

(56) References Cited

U.S. PATENT DOCUMENTS

| | | | | |
|---|---|---|---|---|
| 3,782,337 A * | 1/1974 | Feller | ............ | F02B 53/00 123/213 |
| 3,971,230 A * | 7/1976 | Fletcher | ............ | F02G 1/0435 62/6 |
| 4,033,304 A * | 7/1977 | Luria | ............ | F02D 13/0234 123/78 A |
| 4,169,435 A * | 10/1979 | Faulconer, Jr. | ............ | F02B 75/042 123/48 A |
| 4,254,745 A * | 3/1981 | Noguchi | ............ | F02B 33/22 123/51 B |
| 4,487,172 A * | 12/1984 | Suhre | ............ | F01L 5/10 123/76 |
| 4,516,537 A * | 5/1985 | Nakahara | ............ | F02D 15/04 123/48 AA |
| 4,625,684 A * | 12/1986 | Van Avermaete | ............ | F02B 41/04 123/48 A |
| 4,860,711 A * | 8/1989 | Morikawa | ............ | F02D 15/04 123/48 D |
| 5,188,066 A * | 2/1993 | Gustavsson | ............ | F02B 75/02 123/48 A |
| 5,193,493 A * | 3/1993 | Ickes | ............ | F01L 1/04 123/48 R |
| 5,289,802 A * | 3/1994 | Paquette | ............ | F01B 7/14 123/18 A |
| 5,341,771 A * | 8/1994 | Riley | ............ | F02D 15/04 123/48 AA |
| 5,596,955 A * | 1/1997 | Szuba | ............ | F01L 5/04 123/51 AA |
| 6,354,250 B1 * | 3/2002 | Rodriguez Lopez | ............ | F02B 75/041 123/48 A |
| 6,427,643 B1 * | 8/2002 | Dixon | ............ | F02B 19/06 123/48 A |
| 6,672,270 B2 * | 1/2004 | Armer | ............ | F02B 75/04 123/188.4 |
| 7,387,093 B2 * | 6/2008 | Hacsi | ............ | F02B 75/042 123/51 R |
| 8,215,280 B2 * | 7/2012 | Furr | ............ | F02B 75/02 123/197.4 |
| 8,413,619 B2 * | 4/2013 | Cleeves | ............ | F01B 7/02 123/78 F |
| 8,857,404 B2 * | 10/2014 | Furr | ............ | F02B 75/02 123/197.4 |
| 9,206,749 B2 * | 12/2015 | Cleeves | ............ | F01L 1/3442 |
| 9,239,003 B1 * | 1/2016 | Manke | ............ | F02B 23/104 |
| 9,976,451 B2 * | 5/2018 | Philippe | ............ | F01L 7/02 |
| 10,443,491 B1 * | 10/2019 | Hilgert | ............ | F01B 3/04 |
| 10,465,516 B1 * | 11/2019 | Hilgert | ............ | F01B 3/002 |
| 10,570,817 B2 * | 2/2020 | Hedman | ............ | F01L 13/0036 |
| 10,598,089 B1 * | 3/2020 | Hilgert | ............ | F02B 75/32 |
| 10,641,167 B2 * | 5/2020 | Hedman | ............ | F02B 75/042 |
| 10,947,846 B2 * | 3/2021 | Todeschini Hilgert | ............ | F01B 3/002 |
| 2003/0221652 A1 * | 12/2003 | Armer | ............ | F02B 41/00 123/188.4 |
| 2007/0089694 A1 * | 4/2007 | Hacsi | ............ | F02B 21/00 123/48 D |
| 2009/0223483 A1 * | 9/2009 | Furr | ............ | F02B 75/32 123/311 |
| 2010/0192916 A1 * | 8/2010 | Turner | ............ | F01L 5/06 123/48 C |
| 2012/0085302 A1 * | 4/2012 | Cleeves | ............ | F02D 15/00 123/55.2 |
| 2013/0008408 A1 * | 1/2013 | Furr | ............ | F02B 75/32 123/197.4 |
| 2013/0036999 A1 * | 2/2013 | Levy | ............ | F02B 75/282 123/299 |
| 2013/0092132 A1 * | 4/2013 | Gabdullin | ............ | F01B 7/16 123/48 R |
| 2013/0220279 A1 * | 8/2013 | Cleeves | ............ | F01L 1/3442 123/48 R |
| 2015/0136067 A1 * | 5/2015 | Furr | ............ | F16C 3/22 123/197.4 |
| 2016/0025002 A1 * | 1/2016 | Ellis | ............ | F01L 5/20 123/51 B |
| 2018/0306071 A1 * | 10/2018 | Hedman | ............ | F02B 3/12 |
| 2019/0301362 A1 * | 10/2019 | Hedman | ............ | F02B 75/042 |
| 2020/0141312 A1 * | 5/2020 | Todeschini Hilgert | ............ | F01B 3/0023 |
| 2021/0115846 A1 * | 4/2021 | Todeschini Hilgert | ............ | F02B 25/08 |

* cited by examiner

Tangential Force Converting Ratio $$Cr = \frac{\sin\left(a + \sin^{-1}\left(\frac{R}{L}\sin a\right)\right)}{\cos\left(\sin^{-1}\left(\frac{R}{L}\sin a\right)\right)} \quad \text{— 402}$$

Combustion Chamber Volume $V=$ $$+(L+R+Vc)-\left(L\cos\left(\sin^{-1}\left(\frac{R}{L}\sin a\right)\right)+R\cos a\right)$$

$$+(l-r)-\left(l\cos\left(\sin^{-1}\left(\frac{r}{l}\sin ka\right)\right)-r\cos ka\right)$$

wherein bore area=1, k= 2, 3, 4, 5,

Tangential Force on crankshaft $$Fu = N\frac{Cr}{V}$$

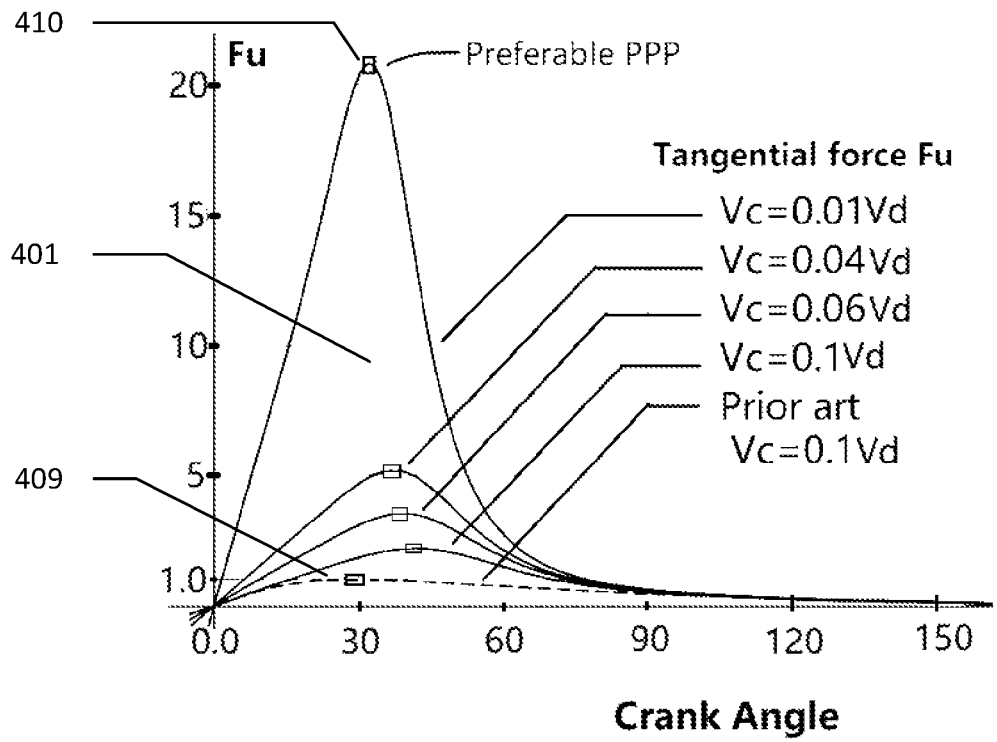

Figure 4

DIRECT TORQUE CONTROL, PISTON ENGINE

FIELD OF THE INVENTION

The present disclosure relates to piston engine. More specifically, the present disclosure relates to a novel piston engine which is no longer restricted by its compression ratio, and is independent of the type of fuel it uses. In the novel piston engine, the tangled relations of ignition timing, rpm, air/fuel ratio, etc. can be decoupled, and its fuel efficiency is improved.

BACKGROUND OF THE INVENTION

There are certain disadvantages relating to the existing prior art piston engines, including, inter alia:
1) Start of ignition timing is restricted by the position of the top dead center (TDC) of the piston engine, for example, between 5° BTDC to 35° BTDC;
2) Due to the limitation of ignition timing, when running at low revolutions per minute (rpm), the peak pressure position (PPP) of the piston is too close to the TDC, causing the tangential force generated on the crankshaft to be small, and the torque to be also small; and
3) A variety of factors, such as the nature of the fuel used, piston compression ratio, ignition timing, rpm, air/fuel ratio, etc. affect each other, and it is difficult to directly control the torque of each combustion.

Therefore, there remains a need for novel piston engine which is no longer restricted by its compression ratio, is independent of the type of fuel it uses, and where ignition timing, rpm, air/fuel ratio, etc. can be easily chosen or/and controlled, and its fuel efficiency to be improved.

SUMMARY OF THE INVENTION

The present invention aims to change the trajectory of the combustion chamber volume V versus the crank angle of the crankshaft, so that:
1) The trajectory of the combustion chamber volume V versus the crank angle forms a plateau near the TDC, and the value of V within this plateau remains basically unchanged;
2) The ignition position can stay ahead the TDC (BTDC) or lag behind the TDC (ATDC) position; there are more options, for example, between 42° BTDC to 32° ATDC;
3) The peak pressure position (PPP) of piston in each combustion can be controlled, such as making the PPP closer to a specific position, for example, closer to the preferable PPP, in order to achieve the required torque characteristics; and
4) Since the position of the PPP can be independently controlled, the tangential force of each combustion on the crankshaft can be directly controlled, thereby achieving direct torque control.

According to an aspect of at least one embodiment, there is provided piston engine, comprising:
a cylinder defining an interior space therein,
the cylinder encloses a chamber therein, a main piston configured to fit horizontally and sealingly in the cylinder and move up and down along its centerline therewithin, and an auxiliary piston configured to fit sealingly in the cylinder and move up and down along its centerline therewithin,
the main piston and the auxiliary piston move at different frequencies,
the enclosed space within the cylinder and between the main piston and the auxiliary piston forms a combustion chamber with volume V,
the main piston is connected to a first connection rod, the first connection rod is connected to a first crankshaft, the displacement of the main piston is Vd,
the auxiliary piston is connected to a second connection rod, the second connection rod is connected a second crankshaft,
wherein the length of the second connection rod is shorter than the length of the first connection rod,
movement of the auxiliary piston relates to the rotational movement of the first crankshaft, wherein with any position of the first crankshaft, the auxiliary piston is at a corresponding position,
the movements of the main piston and the auxiliary piston follow a relationship, rendering the combustion chamber volume V to form a plateau, from 15° BTDC to 15° ATDC with respect to the crank angle of the first crankshaft of the plateau, the variation of the combustion chamber volume V is within 1/100 of Vd,
wherein the piston engine has a preferable PPP crank angle, wherein for a given amount of fuel, a maximum torque is obtained when the peak combustion pressure is at the preferable PPP crank angle position.

According to another aspect of at least one embodiment, there is provided a piston engine, comprising:
a cylinder defining an interior space therein,
the cylinder encloses a chamber therein, a main piston configured to fit sealingly in the cylinder and move up and down along its centerline therewithin, and an auxiliary piston configured to fit sealingly in the cylinder and move up and down along its centerline therewithin,
the main piston and the auxiliary piston move at different frequencies,
the main piston is connected to a first connection rod, the first connection rod is connected to a first crankshaft,
the main piston has a displacement volume Vd,
the length of the first connection rode is L,
the throw of the first crank shaft is R,
movement of the auxiliary piston is controlled by a mechanical part connected to the auxiliary piston, the auxiliary piston moves at k times the frequency of the main piston movement,
in each rotation of the first crankshaft, the enclosed space within the cylinder and between the main piston and the auxiliary piston forms a combustion chamber with volume V, wherein V depends on the positions of the main piston and the auxiliary piston,
the combustion chamber volume V is a function of the crank angle of the first crankshaft,
wherein the combustion chamber volume V forms a plateau, from 0° BTDC to 17° ATDC in crank angle of the first crankshaft of the plateau, the variation of the combustion chamber volume V is less than 5/1000 of Vd,
wherein the piston engine has a preferable PPP crank angle, wherein for a given amount of fuel, a maximum torque can be obtained when the peak combustion pressure is at the preferable PPP crank angle position.

According to another aspect of at least one embodiment, there is provided an automobile with direct torque control, (a) the automobile comprises a piston engine, the torque control and/or speed control of the automobile is achieved with fixed ratio transmission and fuel supply, wherein the prison engine comprises:

a cylinder defining an interior space therein, the cylinder encloses a chamber therein, a main piston configured to fit sealingly in the cylinder and move up and down along its centerline therewithin, and an auxiliary piston configured to fit sealingly in the cylinder and move up and down along its centerline therewithin, the enclosed space within the cylinder and between the main piston and the auxiliary piston forms a combustion chamber with volume V, the main piston is connected to an extension rod, the extension rod is connected to a connection rod, and the connection rod is connected to a first crankshaft, the main piston has a displacement Vd, wherein from 0° CA to 360/k ° CA of each rotation of the first crankshaft, the frequency spectrum of the auxiliary piston motion is k times of the frequency spectrum of the main piston motion, and k=2, 3, 4, 5, or 6, the combustion chamber volume V has a plateau, from 0° ATDC to 30° ATDC in crank angle of the first crankshaft, the variation of the combustion chamber volume V is less than 5/1000 of Vd, wherein when the main piston is at its TDC, the auxiliary piston is at its bottom dead center BDC2, (b) the automobile further comprises an air container to store compressed air, (c) a compression chamber is formed between the main piston and the lower end cover of its cylinder, said lower end cover has an inlet valve and an outlet valve, the compression chamber is used to compress air and convert dynamic energy from the first crankshaft into compressed air, wherein the dynamic energy of the automobile is recovered and then stored in the compressed air in the compression chamber through movement of the main piston, when the main piston moves from the TDC to the BDC driven by combustion pressure, the inlet valve is closed and the outlet valve is opened, the compression chamber compresses the air contained and injects the air into the air container through the outlet valve, when the main piston moves from TDC to BDC driven by the first crankshaft, the inlet valve is closed and the outlet valve is opened, the compression chamber compresses the air contained and injects the air into the air container through the outlet valve, and the dynamic energy of the automobile is converted and stored in the compressed air through rotation of the first crankshaft, when the inlet valve is opened, the combustion chamber is connected with outside air, and there is no air compression and no dynamic energy recovery, (d) the automobile comprises a first clutch, wherein the first crank shaft pushes a differential gear to rotate through the first clutch, and the differential gear pushes a wheel to rotate, wherein from the first crankshaft to the wheel, gear ratio is fixed and the torque on the first crank shaft is applied to the wheel through a fixed ratio.

Other features and advantages of the present invention will become apparent from the following detailed description and the accompanying drawings, which illustrate, by way of example, the principles of the invention.

BRIEF DESCRIPTION OF THE DRAWINGS

By way of example only, preferred embodiments of the present invention are described hereinafter with reference to the accompanying drawings, wherein:

FIG. 4 is an illustration of an embodiment of a piston engine with an auxiliary piston according to the present invention, showing the tangential force ratio (Cr), combustion chamber volume (V), tangential force (Fu), and their relations, where the Fu curves correspond to different clearance volumes (Vc) respectively;

FIG. 6A is an illustration of an embodiment of a piston engine with a separated air compress chamber according to the present invention, showing the auxiliary piston and its connected parts;

DETAILED DESCRIPTION OF THE INVENTION

Figure 1:
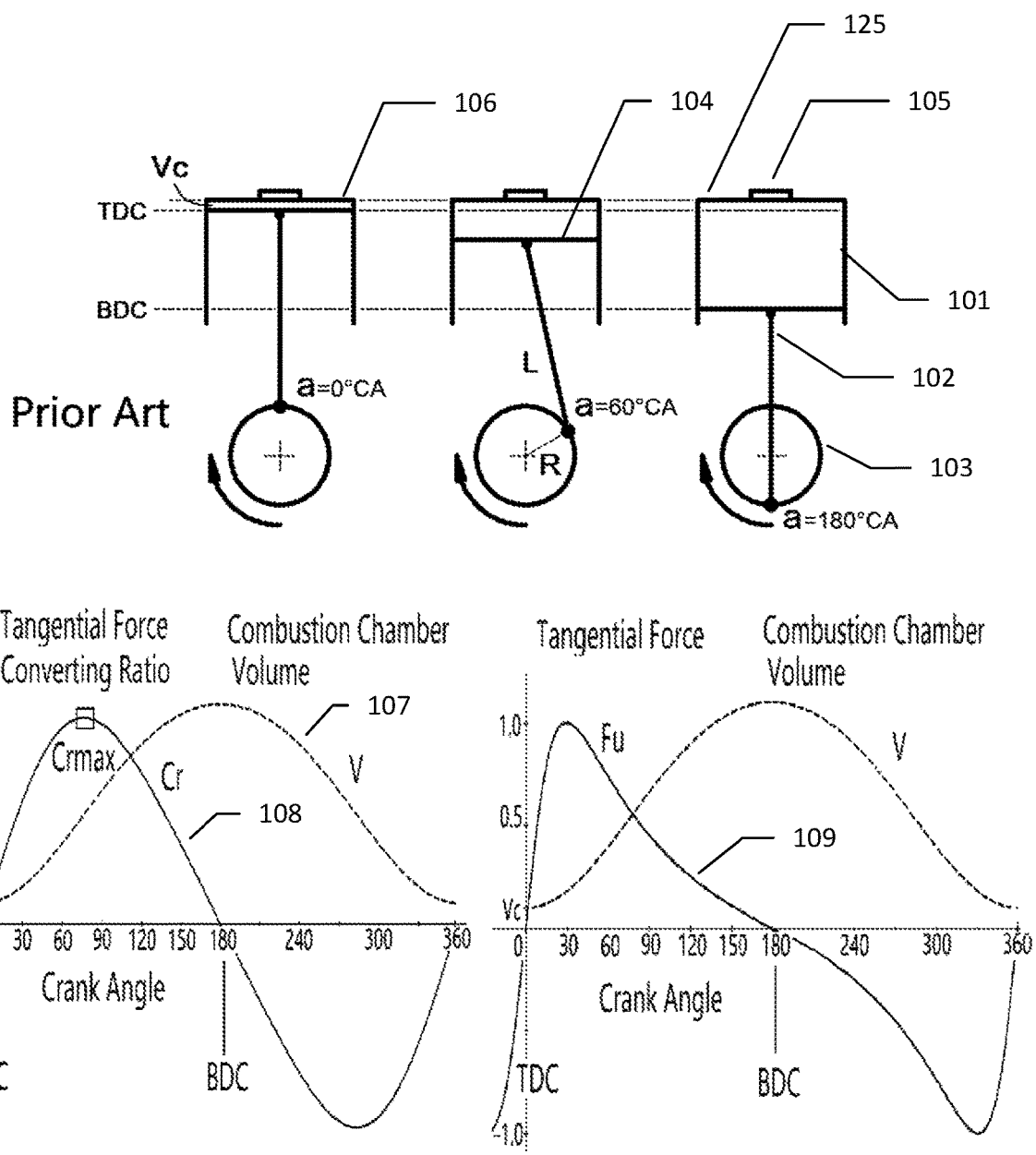
FIG. 1 is an illustration of an existing traditional piston engine (prior art)

It is to be understood that the disclosure is not limited in its application to the details of the embodiments as set forth in the following description. The invention is capable of other embodiments and of being practiced or of being carried out in various ways.

Furthermore, it is to be understood that the terminology used herein is for the purpose of description and should not be regarded as limiting. Contrary to the use of the term "consisting", the use of the terms "including", "containing", "comprising", or "having" and variations thereof is meant to encompass the items listed thereafter and equivalents thereof as well as additional items. The use of the term "a" or "an" is meant to encompass "one or more". Any numerical range recited herein is intended to include all values from the lower value to the upper value of that range.

LIST OF SYMBOLS

V combustion chamber volume
Vc clearance volume of combustion chamber, wherein Vc=m*Vd
Vd displacement volume of piston (or displacement volume of main piston)
m fraction of clearance volume Vc in reference to Vd, wherein m=Vc/Vd
a crank angle, or rotation angle, or CA in degrees of main crankshaft
F1 vertical force applied on piston
F2 tangential force on crankshaft at given F1
Fu tangential force on crankshaft defined as at 1 unit fuel per combustion
Cr tangential force ratio, wherein Cr=F2/F1
$Cr_{max}$ maximum Cr
T torque on crankshaft, wherein T=R*F2, or T=R*Fu
PPP peak pressure position of piston
  or peak combustion pressure position
  or maximum combustion pressure position
Preferable PPP an identical maximum torque position of a piston engine
R crank throw, wherein 2R=stroke=displacement, bore area=1
L connection rod length
TDC top dead center
BDC bottom dead center
ATDC after top dead center
BTDC before top dead center
rpm rotation speed of crankshaft in revolutions per minute Graphics are used in order to simplify the description which involves transcendental functions. In order to simplify the description, most of the parameters in the graph such as Fu, torque, power, fuel mass, piston bore area, volumes are scaled for ease of understanding, or are normalized at given conditions, show a mutual contrast relationship instead of the actual values. The crank angle in the graph is the actual value of main crankshaft.

In the description, the torque loss due to combustion leading to the TDC is not considered, nor is the effect of extra torque generated when external compressed air is injected. It is further assumed that the time from the start of ignition to maximum combustion pressure PPP of the fuel is constant, without taking consideration of the influence of changes in temperatures or pressures.

The directions and positions used in the description, such as up, down, vertically, horizontally, left, and right, are based on the directions and relative positions shown in the Figures, and are not necessarily the directions and positions in actual real-life applications.

The terms "rotation" and "revolution" are used to describe angular movement or angular position.

The term "position" used in the description may refer to the physical position or the crank angle position. The abscissa (x-axis) of the variable is identified by the crank angle of main crankshaft.

In the description of the combustion chamber volume (V) and its plateau, the range regarding its crank angle position (x-axis) is expressed as x° BTDC to x° ATDC. The range regarding its capacity volume (y-axis) is expressed as fraction of main piston displacement Vd. There are many choices in practical applications for the variation range of V, such as 1/50, 1/200, 1/1000 of Vd, and they are not limited to the value given in the examples. Vd is normalized as 1 in graph.

FIG. 1 is an illustration of an existing prior art traditional piston engine, which includes a cylinder 101, a piston 104 therewithin the cylinder 101, a connection rod 102 and a crankshaft 103, a cylinder head 125, a manifold 105, and a clearance volume (Vc) 106. The manifold 105 contains several components such as intake valves, exhaust valves, fuel injections, ignition plugs, which are not depicted.

When the piston 104 moves up and down, each position corresponds to a crank angle and a combustion chamber volume (V). This relationship is shown in curve 107.

At the position of crank angle=0, the combustion chamber volume (V) is the smallest, and this smallest volume is the clearance volume (Vc).

Applying a vertical force F1 on piston 104 will generate a tangential force F2 on crankshaft 103. The resulting magnitude of F2 is related to both F1 and the crank angle a. This relationship is expressed as tangential force ratio Cr=F2/F1, such as shown in curve 108.

The mathematical expression is:

$$Cr=\sin[a+\arcsin(R/L*\sin a)]/\cos[\arcsin(R/L*\sin a)]$$

The maximum value of Cr is $Cr_{max}$. When the L/R of piston 104 is between 2.1 to 6, the value of $Cr_{max}$ is approximately between 1.01 to 1.11, and the position of $Cr_{max}$ is between 68° ATDC to 81° ATDC.

For a given type of fuel, the pressure produced by the combustion is inversely proportional to the combustion chamber volume (V). The smaller the V is during combustion, the greater the pressure generated will be.

In order to simplify the analysis, it is assumed that:
The fuel given for each combustion is 1 unit fuel, the fuel is mixed with the ideal ratio of air, or air/fuel equivalence ratio Lambda=1, and the fuel is completely combusted. It is assumed that the combustion duration of this 1 unit fuel is the same regardless of other conditions. The time from the start of ignition to peak combustion pressure PPP is 3 milliseconds (3 ms or 3/1000 second).

The tangential force produced when 1 unit fuel is combusted is defined as Fu:

$$Fu=N*Cr/V$$

wherein:
N is a coefficient,
Cr is tangential force ratio, and
V is combustion chamber volume.

For a piston engine, both V and Cr are functions of crank angle a.

The relationship between Fu, V and crank angle is shown in curve 109.

Comparing curves 107, 108, and 109, it can be seen that the maximum value of Fu appears at a certain position between Vc and $Cr_{max}$ in reference to crank angle a.

The crank angle position of the maximum torque or maximum tangential force is defined as preferable PPP. Preferable PPP is a physical position of a piston, preferable PPP has nothing to do with fuel, ignition or combustion. Rather, preferable PPP is determined by the physical configurations of a piston and its connection rod and crankshaft.

For example, in existing prior art piston engine, when L=4, R=1, Vc=0.1 Vd, the maximum value of torque or tangential force appears at 29.5° ATDC and preferable PPP is 29.5° CA.

Peak pressure PPP and preferable PPP are different.

For each combustion, there is a PPP. This PPP may occur at any crank angle position. The maximum tangential force or torque can be achieved only when the PPP position is at the preferable PPP position.

The present invention aims to make each PPP as close as possible to the preferable PPP, in order to generate the maximum tangential force Fu and torque.

To summarize: For any piston engine, if its structure is the same as piston 104, it follows the following relationship:

$$Fu=N*Cr/V$$

$$Cr=\sin[a+\arcsin(R/L*\sin a)]/\cos[\arcsin(R/L*\sin a)]$$

If the shape or trajectory of the combustion chamber volume (V) versus the crank angle (a) is changed, Fu can be changed.

If the V near the TDC position is extended to a wider plateau, the ignition timing can be changed in a greater range (x° BTDC to x° ATDC) to obtain different Fu.

To simplify the description, the maximum value of Fu of prior art is defined as 100%=1. In the following examples, Fu of prior art=1 is used as the benchmark for comparison.

According to the present invention, the fixed cylinder head 125 in the prior art piston engine is replaced with a moving auxiliary piston, thereby changing the movement trajectory of the combustion chamber volume (V), and changing the characteristics of Fu.

Figure 2:
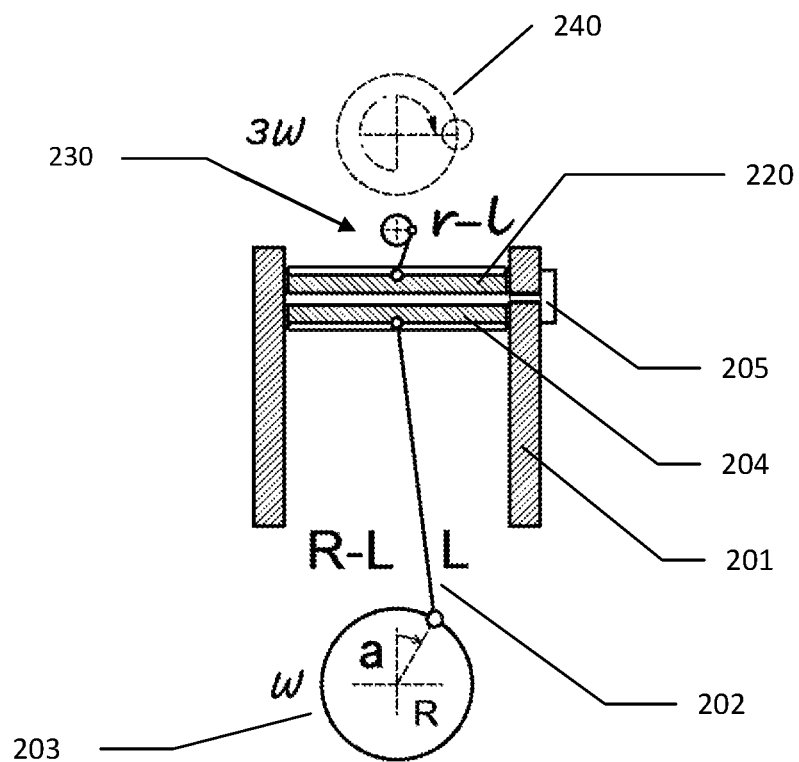
FIG. 2 is an illustration of an embodiment of a piston engine with an auxiliary piston according to the present invention.

Referring to FIG. 2, a moving auxiliary piston 220 is used to replace the fixed cylinder head 125 in the prior art system. The engine of the invention comprises a cylinder 201, a main piston 204 and an auxiliary piston 220, wherein the auxiliary piston 220 is part of an auxiliary component 230.

Figure 2A:
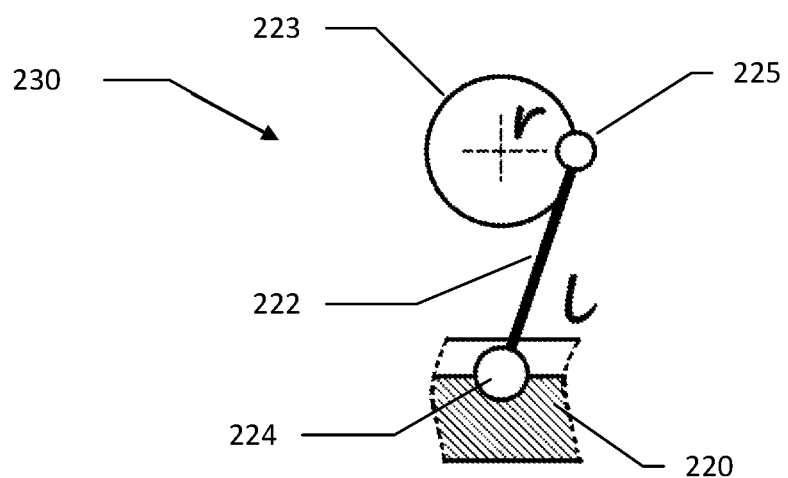
FIG. 2A is an illustration of an embodiment of a piston engine with an auxiliary piston according to the present invention, showing the auxiliary piston and its connected parts.

Referring to FIG. 2A, which is an enlarged view of the auxiliary component 230, the auxiliary component 230 comprises the auxiliary piston 220, the auxiliary piston 220 connected to a connection rod 222 and a crankshaft 223, a big end bearing 225, and a pin and piston bushing 224. The movement of the auxiliary piston 220 is determined by the movement of the crankshaft 223.

Referring back to FIG. 2, the main piston 204 has a connection rod 202 and a crankshaft 203. A manifold 205 attached to the cylinder 201 comprises intake valves, exhaust valves, fuel injections, and ignition plugs, which are not shown.

In the following descriptions, the crankshaft connected to the main piston is defined as main crankshaft.

The rotational angular velocity W2 of the crankshaft 223 of the auxiliary piston 220 is an integer multiple of the rotational angular velocity W1 of the crankshaft 203 of the main piston 204, i.e.:

$$W2=kW1$$

wherein:
k=2, 3, 4, 5, or 6, etc.

In the description, unless otherwise specified, crank angle refers to the crank angle of the crankshaft 203 of the main piston 204.

Referring again to FIGS. 2 and 2A, the length of the connection rod 202 of the main piston 204 is L, and the crank throw of the main piston is R. The length of the connection rod 222 of the auxiliary piston 220 is 1, and the crank throw of the auxiliary piston is r.

Figure 3:
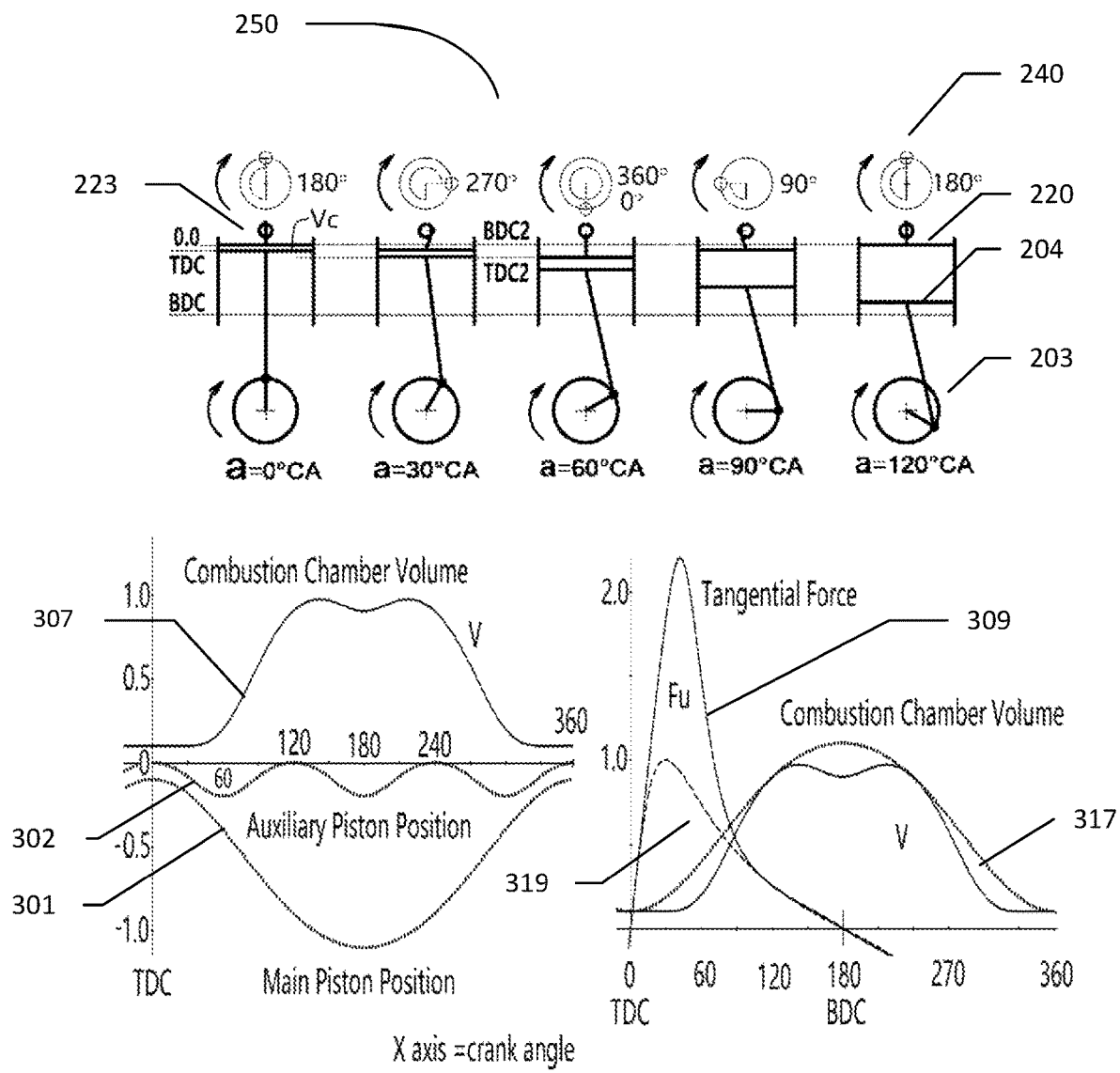
FIG. 3 is an illustration of an embodiment of a piston engine with an auxiliary piston according to the present invention, showing the combustion chamber volume (V), tangential force (Fu) and the piston movement/positions when W2=3W1.

When W2=3W1, the crankshaft 203 and the crankshaft 223 rotate angles are shown as 240 in FIGS. 2 and 3. A 180° CA offset of two crank shafts are preset.

In FIG. 3, the positional relationship between the main piston 204 and the auxiliary piston 220 is expressed as 250. Furthermore:

The TDC of the main piston 204 is defined as being the farthest position from the crankshaft 203 of the main piston, i.e., a=0° CA.

The BDC of the main piston 204 is defined as being the closest position to the crankshaft 203 of the main piston, i.e., a=180° CA.

The TDC2 of the auxiliary piston 220 is defined as being the farthest position from the crankshaft 223 of the auxiliary piston, this corresponds to a=60° CA, 180° CA, or 300° CA of the main crankshaft.

The BDC2 of the auxiliary piston 220 is defined as being the closest position to the crankshaft 223 of the auxiliary piston, this corresponds to a=0° CA, 120° CA, 240° CA, or 360° CA of the main crankshaft.

In FIG. 3, the position of the main piston 204 is shown as curve 301; the position of the auxiliary piston 220 is shown as curve 302. When the main piston 204 and the auxiliary piston 220 move according to these conditions, a space is formed between the main piston 204 and the auxiliary piston 220, and this space is the combustion chamber. This combustion chamber volume (V) is shown as curve 307.

When L=4, R=1, l=0.63, r=0.2.

As shown in FIG. 3, the combustion chamber volume (V) curve 307 forms a plateau in the range of 30° BTDC to 30° ATDC, within this plateau, V hardly changes. Hereinafter, the term "plateau" is used to describe the almost unchanged V from x° BTDC to x° ATDC of crank angle.

When the main piston 204 is in its TDC position, the auxiliary piston 220 is in its BDC2 position, the combustion chamber volume V is at its minimum, i.e., at its clearance volume Vc.

Within the plateau from 30° BTDC to 30° ATDC, V is approximately Vc, and the variation range is less than 2/1000 of Vd.

Compared with existing prior art engines, from 30° BTDC to 30° ATDC, the variation of V is greater than 8% of Vd.

In FIG. 3, Fu (where Fu=N*Cr/V) is shown as curve 309. Near its maximum value, Fu is more than doubled in its value when compared to curve 319 of the prior art.

Curve 319 is the Fu curve of existing prior art engines. Curve 319 and Curve 109 in FIG. 1 are the same curve.

Curve 317 is a comparison between combustion chamber volume of existing prior art engine and the combustion chamber volume V of the present invention.

FIG. 3 shows that with the same clearance volume Vc, the same fuel, because the shape of the V is different, the Fu value is more than doubled according to the present invention versus existing prior art engines.

If Vc is further changed, more Fu curves can be obtained.

When L=4, R=1, l=0.63, r=0.2, for different clearance volume Vc, the results are shown as 401 in FIG. 4.

In FIG. 4, the comparison of the different Fu values corresponding to Vc=0.1 Vd, 0.06 Vd, 0.04 Vd, 0.01 Vd is shown in curves 401. For different Vc, the curve Fu is different. Each Vc corresponds to a maximum value Fu, this maximum value is the preferable PPP as defined previously. Preferable PPP when Vc=0.01 Vd is shown as 410. Curve 409 in FIG. 4 corresponds to the Fu of existing prior art engines when Vc=0.1 Vd.

In other words, for a main piston 204 of a given size (L and R), different torque characteristics can be obtained with different auxiliary piston configurations:

1. Different sizes of l and r can be selected, and different plateau ranges x° BTDC to x° ATDC of V can be determined; that is, the trajectory or shape of the V curve 307 can be formed via l and r selection.
2. Different angular velocities can be selected to obtain different V curves.
3. Different Vc values can be chosen to obtain different preferable PPP.
4. The timing of ignition of each combustion can be chosen to make the PPP as close as possible to the preferable PPP position, in order to generate the most ideal torque.

The method of the present invention follows all the basic principles of the piston engine. However, due to the introduction of the auxiliary piston, the combustion chamber volume V has a plateau. In this plateau, V remains almost unchanged, which means:

1. there are more ignition positions to choose from;
2. when a same fuel is burned under a same V within the plateau, different torques can be produced at different ignition or combustion positions.

Compared to existing prior art piston engines, the present invention has significant advantages.

Using the same fuel (defined as 1 unit fuel per combustion), tangential force Fu is increased significantly. This means that the output torque and the fuel efficiency are greatly improved. For each combustion, output torque can be controlled; the multi-stage transmission gears in traditional automobiles can be simplified or even possibly eliminated.

In practical applications, as long as the rotational angular velocity of crankshaft 223 of the auxiliary piston 220 is an integer multiple (2, 3, 4, 5, 6, etc.) of the rotational angular velocity of crankshaft 203 of the main piston 204, different l, r and different Vc can be chosen, and different V curves can be obtained. These V curves have different plateaus. For each combination of choices, the shape of V is different, but each resulted Fu follows the same basic principle.

Figure 4A:
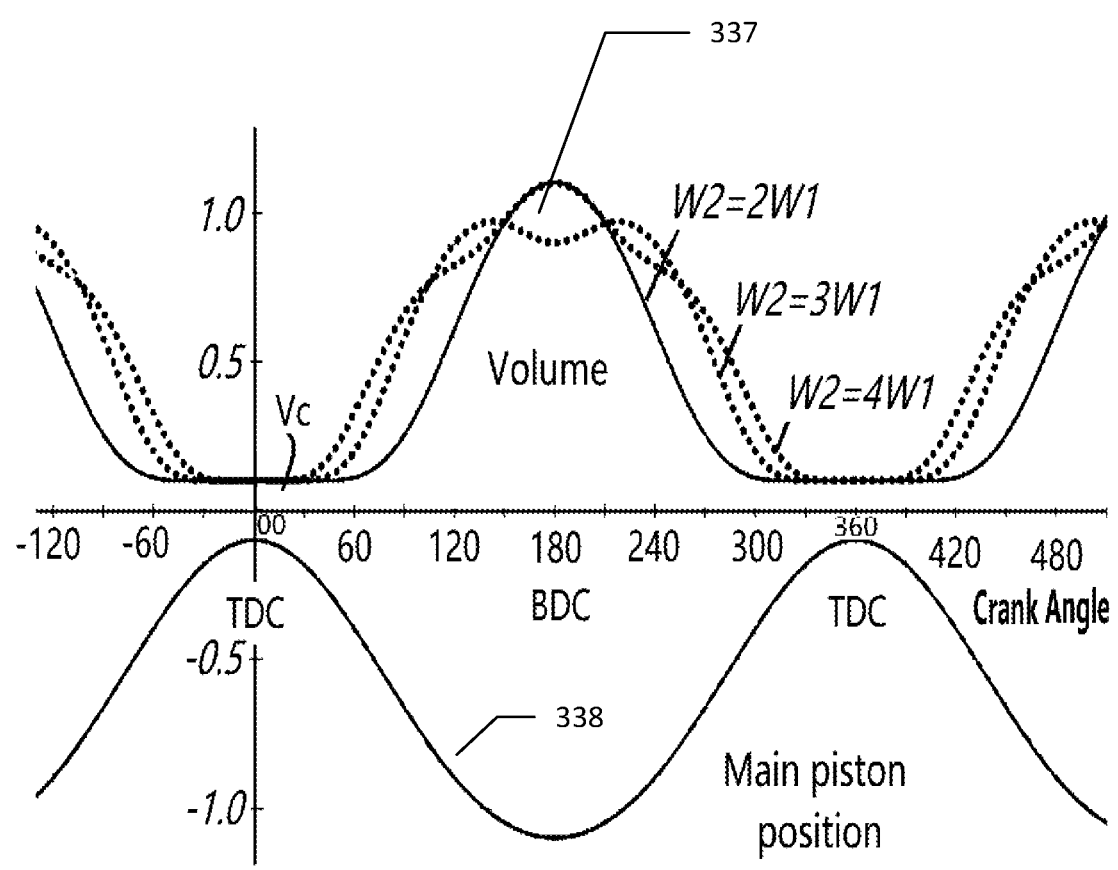
FIG. 4A is an illustration of an embodiment of a piston engine with an auxiliary piston according to the present invention, showing the combustion chamber volume (V), the piston positions, crank angle and their relations with different angular velocities.

FIG. 4A shows the different V curves obtained by the same L and R with different W1, W2 and different l, r.

Curve 338 is the positional relationship of the main piston, which keeps unchanged in all the descriptions.

Curve 337 is different shapes of the combustion chamber volume (V) with W2=2W1, W2=3W1, W2=4W1.

For each W2=kW1, there can be a variety of different options of l and r, in order to obtain different shapes of V.

Below are some examples, corresponding to different options of l and r and the different results obtained:

TABLE 1

Effect of Auxiliary Position

| Main piston | Auxiliary piston | Results |
| --- | --- | --- |
| W1 = W1<br>L = 4<br>R = 1 | W2 = 2W1<br>l = 1.58<br>r = 0.41 | wide plateau<br>biggest l, r sizes |
| W1 = W1<br>L = 4<br>R = 1 | W2 = 3W1<br>l = 0.63<br>r = 0.20 | moderate plateau<br>moderate l, r sizes |
| W1 = W1<br>L = 4<br>R = 1 | W2 = 4W1<br>l = 0.6<br>r = 0.1 | small plateau<br>small l, r sizes |
| W1 = W1<br>L = 4<br>R = 1 | W2 = 5W1<br>l = 0.43<br>r = 0.06 | smaller plateau<br>smaller l, r sizes |

Different rotation angular velocity relationships will affect the maximum value of the combustion chamber V.

TABLE 2

Effect of Auxiliary Piston Crankshaft

| Main piston crankshaft | Auxiliary piston Crankshaft | Results |
| --- | --- | --- |
| W1 | 2W1, 4W1<br>(Even) | Max. V unchanged<br>Max. V = Vd + Vc |
| W1 | 3W1, 5W1<br>(Odd) | Max. V reduced<br>Max. V < Vd + Vc |

When the rotational angular velocity of crankshaft 223 is an even multiple of main crankshaft 203, the maximum value of V remains unchanged (V=Vd+Vc). When the rotational angular velocity of crankshaft 223 is an odd multiple of main crankshaft 203, the maximum value of V becomes smaller (V<Vd+Vc).

Following the above principles, different W2, W1, different L, R, different l, r can be combined to form a large number of sets of V curves to obtain different Fu characteristics and different torque characteristics.

Based on the above analysis, five implementation examples are provided below.

Example 1

In the cylinder 201, there are two pistons, the main piston 204 and the auxiliary piston 220. The main piston 204 has the connection rod 202 and the crankshaft 203, and the auxiliary piston 220 has the connection rod 222 and the crankshaft 223. The main piston 204 and auxiliary piston 220 form a combustion chamber V, as shown in FIG. 2 and FIG. 2A.

The rotational angular velocity of crankshaft 223 is three (3) times the angular velocity of that of crankshaft 203. When the main piston 204 is at its TDC position, the auxiliary piston 220 is at its BDC2 position. At this position, the combustion chamber volume V formed by the main piston 204 and auxiliary piston 220 is the smallest, V=Vc.

The main piston 204 compresses the air/fuel mixture during the compression stroke. The choice of the value of Vc ensures that the air/fuel mixture does not ignite by itself during compression, and ignition plug must be used to initiate combustion. In other words, according to the type of fuel used, a compression ratio is selected to avoid knocking.

Figure 5:
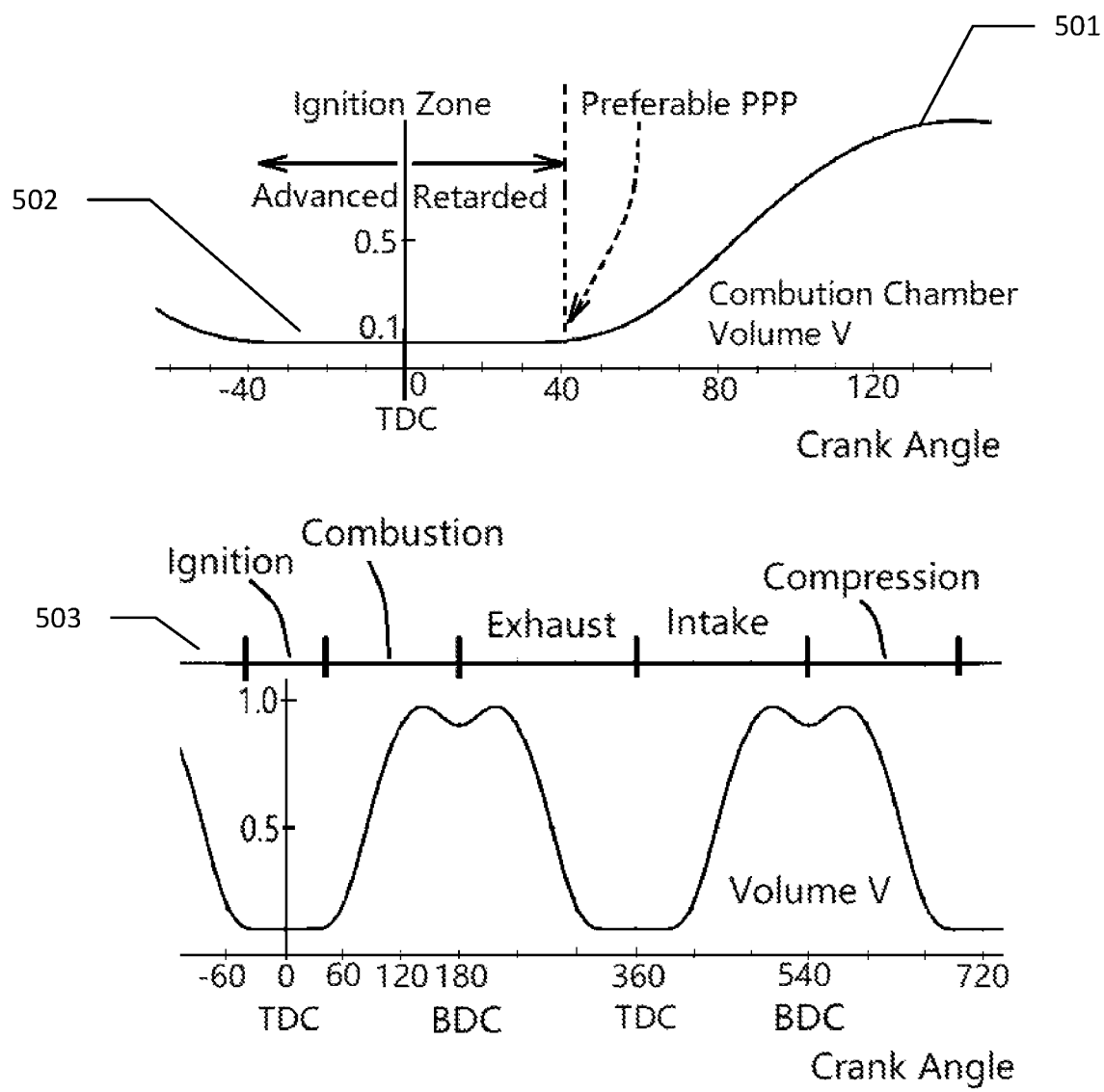
FIG. 5 is an illustration of an ignition sequence 1 of an embodiment according to the present invention.

Referring to FIG. 5, the main piston 204 performs a 4-stroke movement, the same as in the existing prior art piston engines. The combustion chamber volume V is shown as curve 501. As can be seen, a plateau 502 is formed near the TDC. In the range of 30° BTDC to 30° ATDC, the change of V is less than 2/1000 of Vd, therefore it can be approximated that V=Vc.

Curve 503 shows the relationship between the sequence of operations of manifold 205, the combustion chamber volume V and crank angle. Except for the different ignition timing, the other operating sequence and the existing prior art piston engines are similar.

The sequence is as follows:
1. during the downward stroke of the main piston, fresh air is sucked in and fuel is injected,
2. the mixed gas is compressed after BDC when the main piston moves up,
3. the mixed gas is ignited near or within the plateau 502, combustion occurs, and
4. the exhaust gas is discharged after the next BDC.

It is assumed that the time from start of ignition to the moment when the maximum pressure is generated is t=3 milliseconds (3 ms or 3/1000 second). In reality, every fuel has a different burning speed, and t is different.

By choosing the ignition time of each combustion, the position of the PPP can be controlled so that it is as close as possible to the position of the preferable PPP.

Ignition timing=crank angle travelled in 3 ms−preferable PPP crank angle

According to this formula, by calculating point by point from 125 rpm to 6000 rpm, and the ignition time for each combustion can be obtained.

Figure 5A:
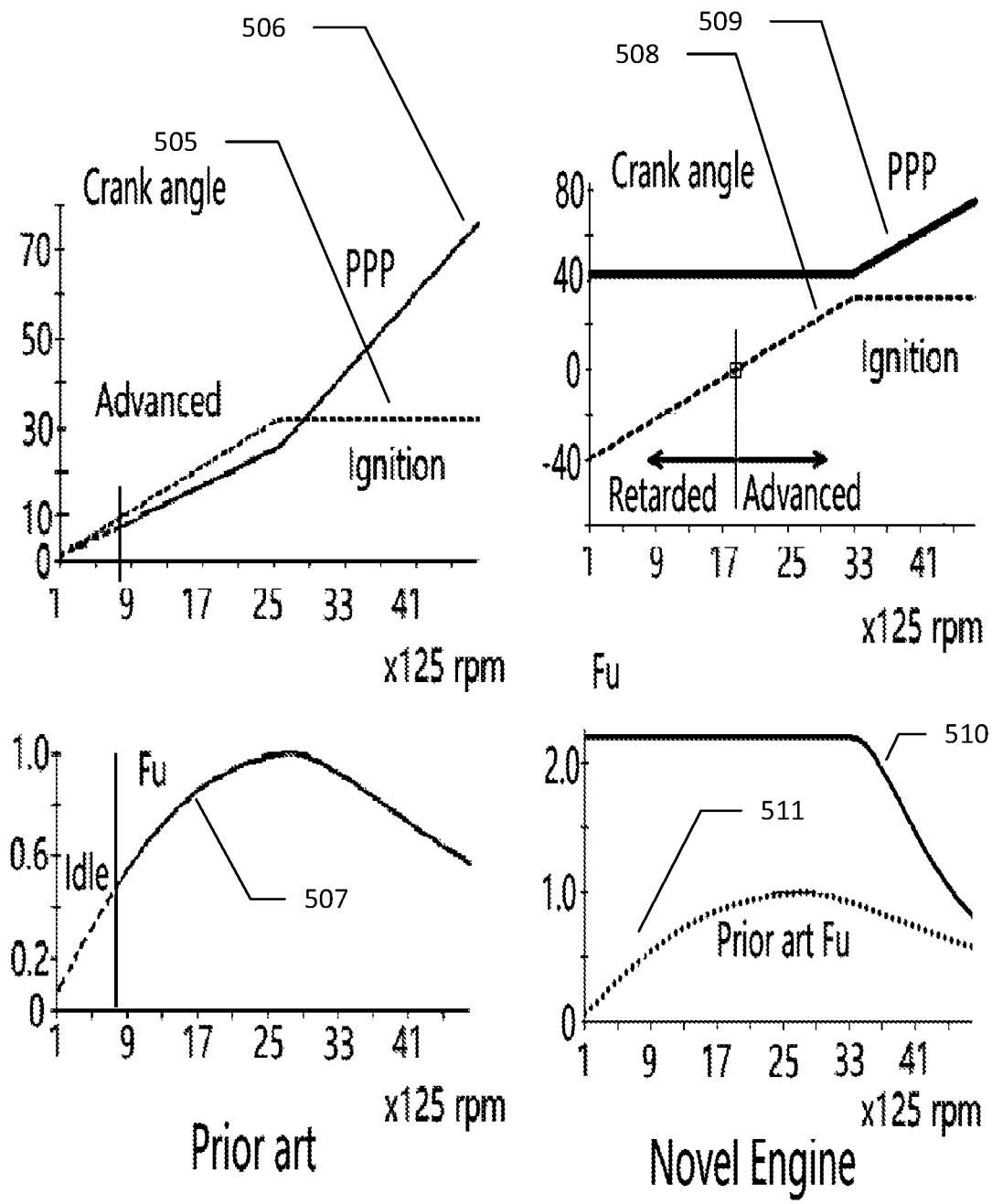
FIG. 5A is a comparison of the ignition timing, the tangential force Fu, the peak pressure position (PPP) and their relations in ignition sequence 1 of an embodiment according to the present invention.

In FIG. 5A, L=4, R=1, Vc=0.1 Vd, 1=0.63, r=0.2, the preferable PPP position is near 42° CA, the ignition curve is expressed as curve 508, and the maximum combustion pressure PPP curve is expressed as 509.

In the low rpm range (<2333 rpm), because the crank angle traveled in 3 ms is small, in order to make the PPP position close to the preferable PPP, the ignition needs to be "retarded", that is, the ignition is after the TDC position.

In the high rpm range (>2333 rpm), because the crank angle travelled in 3 ms is large, in order to make the PPP position close to the preferable PPP, the ignition needs to be "advanced", that is, the ignition is before the TDC position.

In this example, the maximum ignition advanced is 32° CA. When the ignition advanced is over 32° CA, because part of the combustion occurs before the TDC position, negative torque, or torque loss is produced. If there is too much advanced ignition, excessive torque loss will occur.

Referring again to FIG. 5A, the Fu curve of the piston engine of the invention is curve 510. The PPP curve of the existing prior art piston engine is 506, the ignition timing curve of the existing prior art piston engine is 505, and Fu curves of the existing prior art piston engine are shown as 507 and 511.

Comparing curves 508 vs 505, 509 vs 506, the ignition timing and PPP have changed a lot and the tangential force Fu is greatly improved.

At 1000 rpm, Fu is increased by more than 300%. The Fu is high in the low speed range. For example, at 600 rpm, a high effective torque can also be obtained. This means that the idle speed can be reduced to below 600 rpm.

In the existing prior art piston engine, combustion volume V does not have a constant volume area (plateau) similar to curve 502 near the TDC. The ignition timing can only be advanced, retarded ignition is not practicable because this will lead the combustion taking place at a bigger combustion volume, and lower combustion pressure occurs. So Fu is very small, such as below 800 rpm, it can hardly output effective torque.

Example 2

Regarding Example 1, one potential problem is that if Vc is smaller or the compression ratio is higher, the fuel may combust by itself before the ignition plug is activated, which will cause knocking. Example 2 solves this problem.

Based on Example 1, knocking can be prevented via certain sequences of the fuel injection and ignition timing, even if Vc is greatly reduced.

In the cylinder 201, there are two pistons, namely, the main piston 204 and the auxiliary piston 220, the main piston 204 has a connection rod 202 and a crankshaft 203, and the auxiliary piston 220 has a connection rod 222 and a crankshaft 223. The main piston 204 and auxiliary piston 220 form a combustion chamber V. The rotational angular velocity of crankshaft 223 is 3 times the angular velocity of crankshaft 203.

When the main piston 204 is at its TDC position, the auxiliary piston 220 is at its BDC2 position, the combustion chamber volume V formed by the main piston 204 and auxiliary piston 220 is the smallest, that is V=Vc.

Figure 5B:
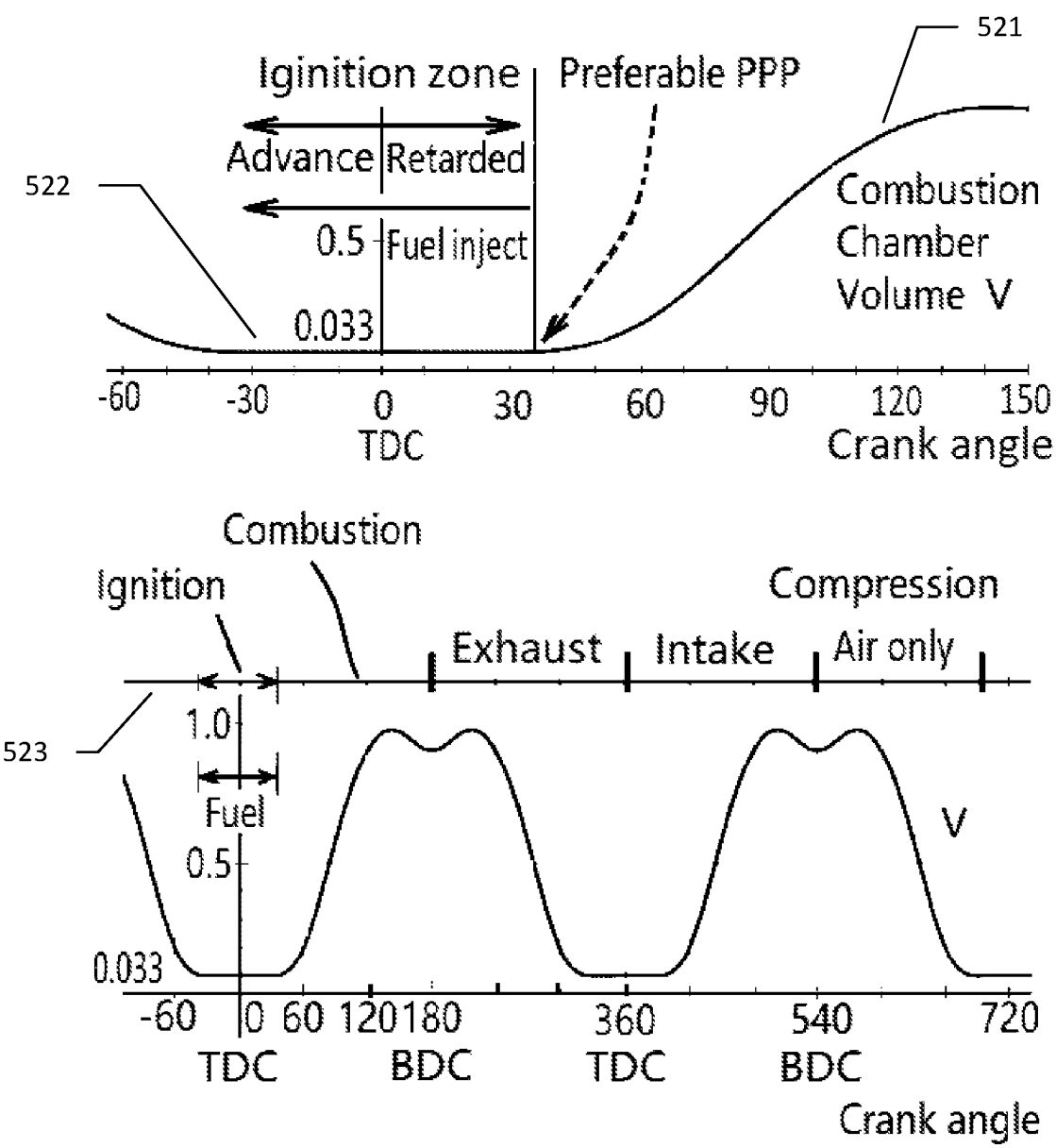
FIG. 5B is an illustration of ignition sequence 2 descriptions of an embodiment according to the present invention.

Referring to FIG. 5B, in the compression stroke of the main piston, only air is compressed, not the air/fuel mixture, that is, air alone is compressed in the compression stroke, and fuel is injected into the combustion chamber only after combustion chamber volume reaches curve 522, in other words, fuel is injected near or within the plateau.

The choice of the size of Vc no longer depends on the fuel type. Vc can be made smaller, for example, Vc is 0.033 Vd, 0.02 Vd, 0.01 Vd, or compression ratio=30/1, 50/1, 100/1, etc.

In Example 2, because there is only air and no fuel in the compression stroke, knocking will not occur.

The ignition is described as follows: If the temperature of the compressed air is sufficiently high, fuel will burn immediately when it is injected; and combustion occurs before activating the ignition plug. If the temperature of the compressed air is not very high, fuel may not combust by itself, and the ignition plug is needed in order to start combustion.

For the above two scenarios, in order to ensure that every combustion can be controlled, ignition and fuel injection should be required at the same time.

In this example, L=4, R=1, Vc=0.033 Vd, 1=0.63, r=0.2, and the preferable PPP angle is around 36.4° CA.

FIG. 5B shows the work sequence of this example. The main piston is in 4-stroke motion, it is the same as in the existing prior art piston engines. The combustion chamber volume V is shown in curve 521. Curve 522 is the plateau formed near the TDC. In the range of 30° BTDC to 30° ATDC30, the change of V is less than 2/1000 of Vd, therefore can approximated as V=Vc=0.033 of Vd. Curve 523 represents the sequence of actions of the components of the manifold 205.

Except for the difference in fuel injection and ignition timing, other operating sequences are similar to that of the existing prior art piston engines.

The sequence is as follows:
1. during the downward stroke of the main piston, fresh air is sucked in,
2. after the BDC the air is compressed when the main piston moves upward,
3. after compression is completed (near plateau 522) fuel is injected and ignited at the same time, combustion occurs, and
4. the exhaust gas is discharged after the next BDC.

It is assumed that the time required from start of ignition to the maximum pressure PPP is 3 ms.

By choosing the ignition timing of each combustion, the position of the PPP can be made as close as possible to the position of the preferable PPP.

Ignition timing=crank angle travelled in 3 ms−preferable PPP crank angle

According to this formula, calculate the point by point from 125 rpm to 6000 rpm, and the ignition time for each combustion can be obtained.

Figure 5C:
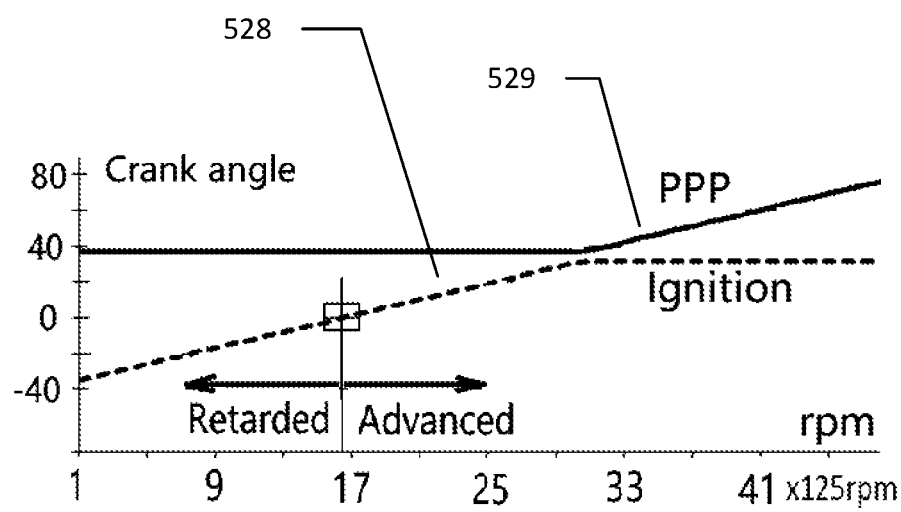
FIG. 5C is a comparison of the ignition timing, the tangential force Fu, the peak pressure position (PPP) and their relations in ignition sequence 2 of an embodiment according to the present invention.
Figure 5C:
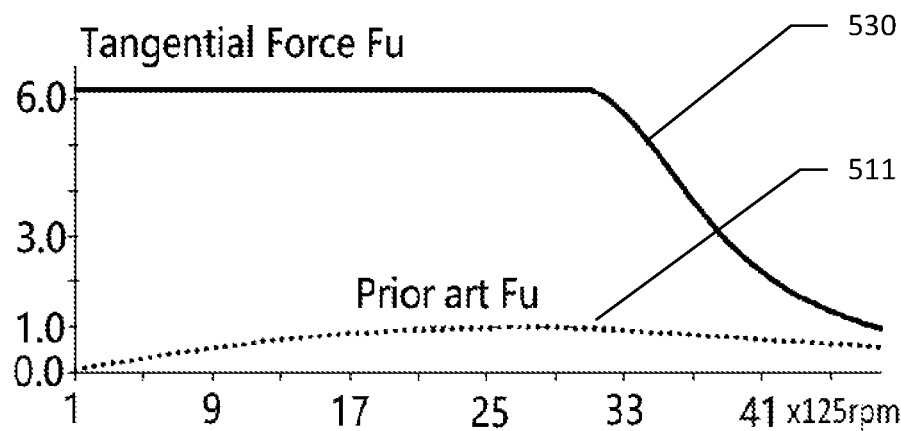

Referring to FIG. 5C, the ignition timing curve is expressed as curve 528, and the maximum combustion pressure PPP curve is expressed as 529, and the Fu curve is expressed as 530.

In the low rpm range (<2056 rpm), because the crank angle travelled in 3 ms is small, in order to make the PPP position close to the preferable PPP, retarded ignition is required, that is, ignition is after the TDC position.

In the high rpm range (>2056 rpm), because the crank angle travelled in 3 ms is large, in order to make the PPP position close to the preferable PPP, advanced ignition is required, that is, the ignition is before the TDC position.

When Vc=0.033 Vd, l=0.63, r=0.2, Fu reaches its maximum value near 36.4° CA, and the preferable PPP position is near 36.4° CA.

In this example, the maximum ignition advanced is 32° CA. When the ignition advanced is bigger than 32° CA, because part of the combustion occurs before TDC position, negative torque or torque loss will be produced. If there is too much advanced ignition, excessive torque loss will occur.

Referring again to FIG. 5C, the Fu of the piston engine of the invention is curve 530, the Fu of the existing prior art piston engines is curve 511. It can be seen that at 1000 rpm, the tangential force Fu is increased by more than 600%.

Therefore, new method has a much higher Fu in the low rpm. For example, the effective torque can be still available at 400 rpm. This means that the idle speed of the piston engine can be reduced to below 400 rpm.

Example 3

There is another shortcoming in Examples 1 and 2. For a piston engine, its compression ratio is fixed, however the control of the air intake is limited in free-sucking and cannot ensure that the fuel injection reaches the best air/fuel mixing ratio. The air/fuel ratio (lambda) is related to the completeness of combustion, as well as the production of NOx and CO after combustion.

In Examples 1 and 2, the mixing ratio of air/fuel can be further configured arbitrarily by controlling the injection of fuel and the injection of air.

In the cylinder 201, there are two pistons, the main piston 204 and the auxiliary piston 220. The main piston 204 has the connection rod 202 and the crankshaft 203, and the auxiliary piston 220 has the connection rod 222 and the crankshaft 223. The main piston 204 and auxiliary piston 220 form a combustion chamber V.

The rotational angular velocity of crankshaft 223 is three (3) times the angular velocity of that of crankshaft 203.

When the main piston 204 is at its TDC position, the auxiliary piston 220 is at its BDC2 position. At this position, the combustion chamber volume V formed by the main piston 204 and auxiliary piston 220 is the smallest, V=Vc.

In Example 3, there is no separate compression stroke. The main piston does not need to compress air during the stroke from BDC to TDC.

The choice of Vc value thus does not depend on the type of fuel. Vc can be made smaller, for example, Vc is 0.033 Vd, 0.02 Vd, 0.01 Vd, or compression ratio=30/1, 50/1, 100/1, etc.

In Example 3, the main piston can be operated as a 2-stroke or a 4-stroke movement. Because there is no compression stroke of the air/fuel mixture, knocking will not occur.

Figure 5D:
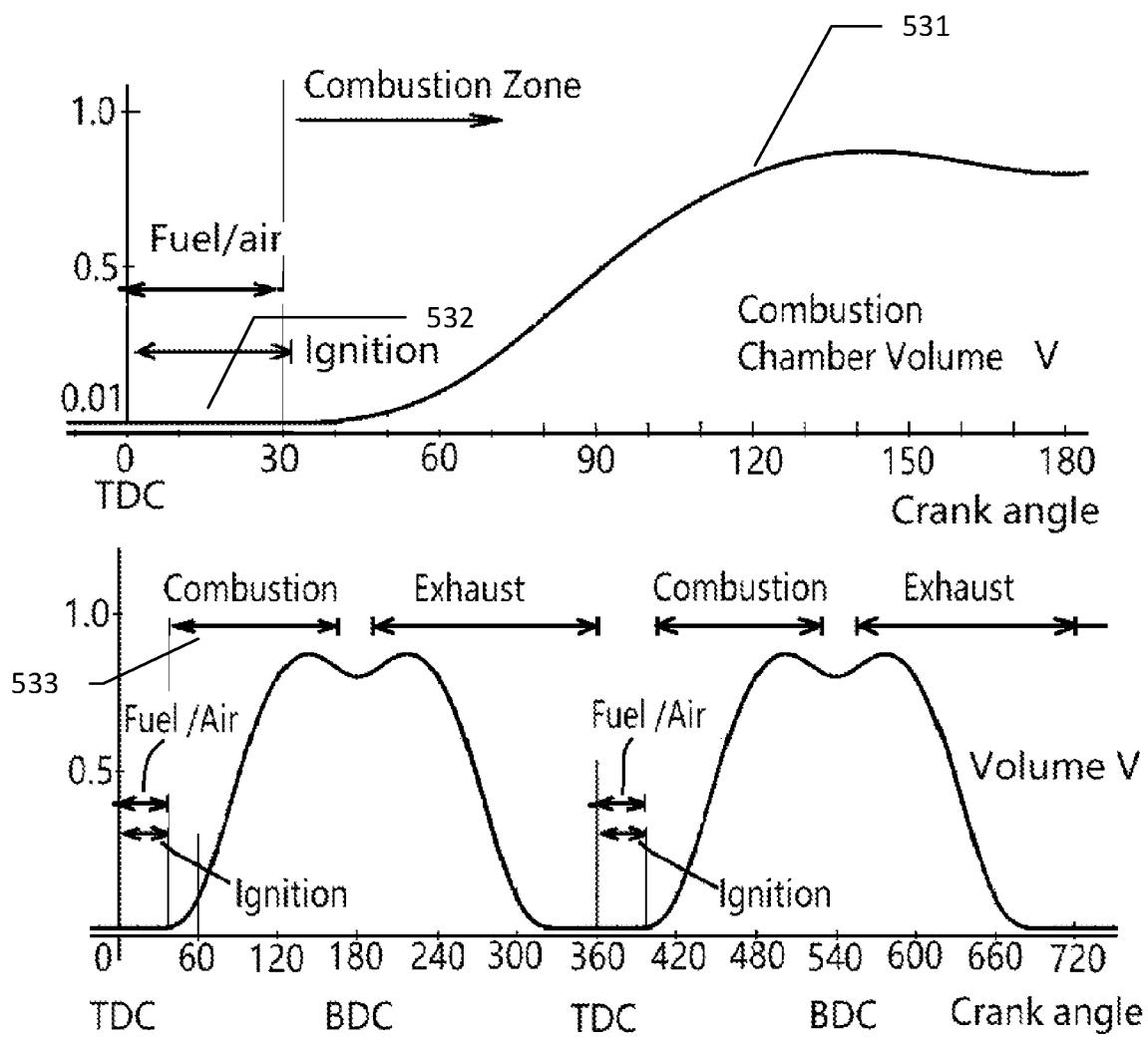
FIG. 5D is an illustration of ignition sequence 3 descriptions of an embodiment according to the present invention.

Referring to FIG. 5D, the air is compressed and stored in advance in external container (not shown in FIG. 2). Air/Fuel is mixed in a predetermined ratio. The air/fuel mixture is injected into the combustion chamber near the TDC and within the plateau 532. There is no further compression after injection.

If air/fuel is injected before the TDC (advanced injection), the compressed air will produce a negative torque; therefore, it should be avoided to inject air/fuel before the TDC. However, in high rpm, advanced injection is conducive to make PPP being closer to the preferable PPP. The torque caused by injected compressed air is ignored in the calculation.

When the injected air/fuel mixture reaches the required mass/volume, the air/fuel mixture is ignited, and combustion occurs.

FIG. 5D shows the working sequence of this example, wherein the combustion chamber volume V is expressed as curve 531, and plateau 532 is formed near the TDC. In the range of 30° BTDC to 30° ATDC, the change of V is less than 2/1000 of Vd, therefore it can be approximated as V=Vc=0.01 Vd. Curve 533 represents the relationship between the various actions of the manifold 205 and the curve of the combustion chamber volume V and the crank angle. The engine of the invention can be operated a 2-stroke or a 4-stroke mode (a complete cycle in 360° CA or in 720° CA), while the existing prior art piston engine involves only a 4-stroke mode (a complete cycle in 720° CA).

The 2-stroke sequence is as follows:
1. the mixed air/fuel is injected near the plateau 532, and ignited immediately after reaching the required mass/volume,
2. combustion occurs,
3. the exhaust gas is discharged near and/or after BDC, and
4. the mixed air/fuel is then again injected near the plateau 532 and ignited immediately after reaching the required mass/volume.

It is assumed that the time from start of ignition to the moment when the maximum pressure PPP is generated is t=3 milliseconds (3 ms or 3/1000 second). By choosing the ignition timing of each combustion, the position of the PPP can be made as close as possible to the position of the preferred PPP.

Ignition timing=crank angle travelled in 3 ms−preferable PPP crank angle

According to this formula, by calculating point by point from 125 rpm to 6000 rpm, and the ignition timing for each combustion can be obtained.

Figure 5E:
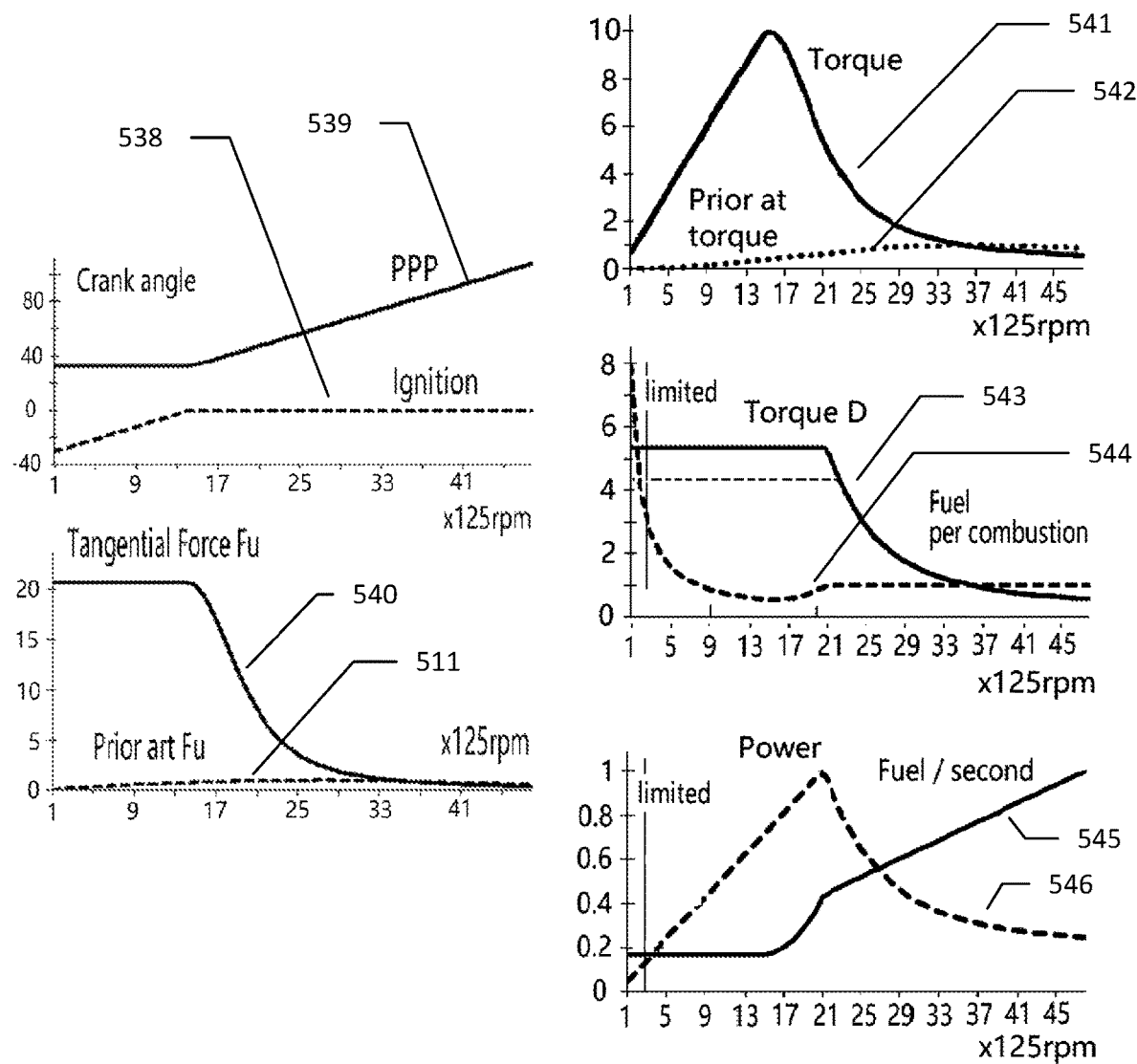
FIG. 5E is an illustration of the ignition timing, the tangential force Fu, the peak pressure position (PPP) and their relations, average torque, preferable drive torque D patterns, fuel consumption in ignition sequence 3 of an embodiment according to the present invention.

The result is shown in FIG. 5E.

In FIG. 5E, L=4, R=1, Vc=0.01 Vd, 1=0.63, r=0.20, the ignition curve is expressed as curve 538, and the maximum combustion pressure PPP curve is expressed as 539.

Air/fuel injection takes a certain period of time. Air/fuel must be injected into the combustion chamber before ignition to ensure that the air/fuel reaches the required mass/volume when ignited. Because injecting the compressed air before the TDC position will cause negative torque, the air/fuel should be injected not too far ahead of TDC, for example, it should not exceed the 5° BTDC position.

In this Example 3, ignition is not advanced, rather, it is only retarded at low rpm. The result is that torque is greatly improved at low rpm, but torque at high rpm is lower than the corresponding torque of the existing prior art piston engines.

Assuming the pressure of the compressed air is 100 bars, and that the temperature of the combustion chamber, the compressed air and the type of fuel will not initiate a combustion before ignition.

When Vc=0.01 Vd, the maximum Fu occurs at 32.2° CA, that is, the preferable PPP is 32.2° CA.

In the low rpm range (<1875 rpm), because the crank angle travelled in 3 ms is small, in order to make the PPP position close to the preferable PPP, the ignition needs to be retarded, that is, ignition is after the TDC position.

In the high rpm range (>1875 rpm), ignition is neither retarded nor advanced.

To simplify the analysis, the torque influence caused by injection of the compressed air is not included in the calculation.

In comparison with existing prior art piston engines, in Example 3, Fu is increased by more than 20 times at 1000 rpm.

Example 3 has a high Fu in the low rpm. For example, at 300 rpm, an effective torque can also be output. This means that the idle speed of the piston engine can be reduced to below 300 rpm.

The significant advantages of this Example 3 are further analyzed as shown below:

Referring to FIG. 5E, curve 541 is the average torque under the condition of 1 unit fuel per combustion. In comparison with the existing prior art piston engine, at rpm below 2500 rpm, the average torque is improved by more than 10 times. But when the rpm is higher than 4500 rpm, the average torque of Example 3 is lower than that of the existing prior art piston engine.

Referring again to FIG. 5E, curve 542 is the average torque of the existing prior art piston engine under the condition of 1 unit fuel per combustion. For an automobile, if the average torque on the crankshaft is more than 5 times greater than the maximum average torque of the prior art, it means that there is no need to get higher torque through transmission gears. This is because the transmission maximum gear ratio of a general automobile is about 4-5 (not including the differential gear ratio).

The average torque calculation is based on Torque=R*Fu and divided by the time required for one cycle at a given rpm.

Curve 541 and curve 542 are not actual values, but normalized values.

It can be seen that below 1000 rpm, compared with prior art, the average torque is increased by more than 20 times.

For an automobile, a specific torque curve is desired for a good driving experience. Curve 543 is a desired torque curve because it has a constant torque characteristic at low rpm.

Torque curve 543 shows that torque can be controlled by supplying of air/fuel without a multi-stage transmission. In other words, a single gear with fixed ratio can be used to drive the automobile, thereby eliminating the expensive and complex multi-stage transmission. Prior art piston engine requires a transmission with 5-10 gear ratios to achieve a torque curve similar to that of curve 543.

Curve 544 is the amount of fuel required for each combustion to realize curve 543, wherein baseline is 1 unit fuel. Within the range of curve 543, required drive torque can be achieved by controlling the amount of fuel (air/fuel mixture).

Curve 545 is the output power curve corresponding to torque curve 543. Curve 546 is the fuel supply curve per second corresponding to the power curve 545. The unit of curve 545 is the amount of fuel supplied per second (fuel mass/per second).

Referring to FIG. 5E, there is a vertical limited line near 300 rpm, which means that under a given amount of compressed air, because the restriction of small combustion volume V, the combustion chamber cannot take more fuel and will not produce more torque. If a higher pressure of compressed air is used, more fuel can be mixed and injected and higher torque can be obtained.

FIG. 5E shows that the results of Example 3 are fundamentally different from that of the existing prior art piston engine.

Curves 544 and 545 show that from 1000 rpm to 2500 rpm, the fuel consumption is lower than the rest of rpm, it is considered as the unique sweet spot of the invention.

Curves 540 and 541 are calculated in first rotation (0-360° CA) of the main shaft, so the magnitude in y-axis should be doubled when the engine is operating in 2-stroke mode, and fuel consumption is also doubled.

Example 4

In Example 4, a piston engine with a separate air compression chamber is provided.

Figure 6:
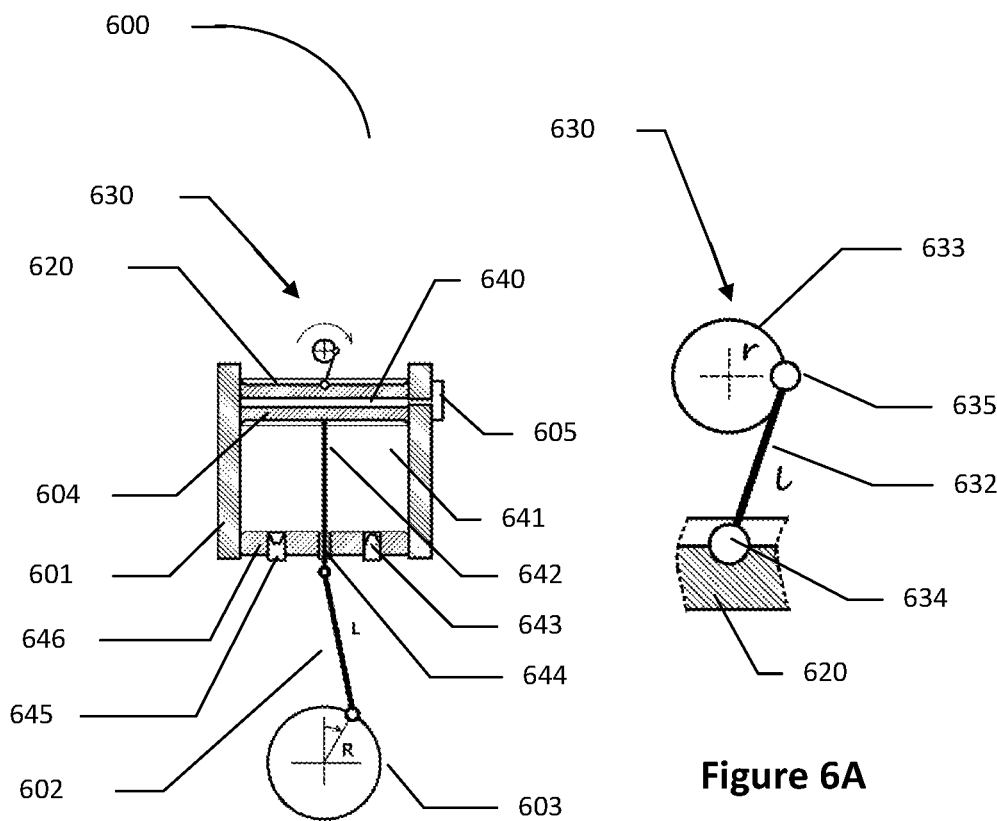
FIG. 6 is an illustration of an embodiment of a piston engine with a separated air compress chamber according to the present invention.

Referring to FIG. 6, based on Example 1, an air compression chamber 641 is added. This air compression chamber can generate compressed air, and dynamic energy on the crankshaft can also be stored in the compressed air. This can recover part of the dynamic energy when an automobile is decelerating.

Referring to FIG. 6, piston engine 600 comprises air compression chamber, and a cylinder 601. In the cylinder 601, there are two pistons, i.e., main piston 604 and auxiliary piston 620, wherein the auxiliary piston 620 is part of an auxiliary component 630. Main piston 604 is connected to crankshaft 603 via extension rod 642 and connection rod 602. The auxiliary piston 620 is connected to crankshaft 633 via connection rod 632.

The rotational angular velocity of crankshaft 633 is an integer multiple of the rotational angular velocity of crankshaft 603. A space is formed between main piston 604 and auxiliary piston 620, and this space is defined as combustion chamber 640.

When main piston 604 is at its TDC position, auxiliary piston 620 is at its BDC2 position, the combustion chamber volume V formed by main piston 604 and auxiliary piston 620 is the smallest, which is clearance volume Vc.

The clearance volume Vc can be any value, such as 0.01 Vd to 0.2 Vd, or less.

Main piston 604 is operated in a 2-stroke movement.

Air compression chamber 641 is formed between main piston 604 and lower end cover 646 of the cylinder 601 to compress air.

There is an outlet valve 643 on the lower end cover 646. When the pressure inside the compression chamber 641 is higher than a pre-set value, outlet valve 643 is opened, and the compressed gas in the compression chamber 641 passes through outlet valve 643 into an external compressed air container. The external compressed air container is not shown in FIG. 6.

There is an inlet valve 645 on lower end cover 646. When inlet valve 645 is closed and the main piston 604 moves from the TDC to BDC, the gas inside the compression chamber 641 is compressed. When inlet valve 645 is opened, the compression chamber 641 communicates with the outside, and the gas inside the compression chamber 641 is not compressed.

When inlet valve 645 is opened and the main piston 604 is moving from the BDC to TDC, compression chamber 641 is connected to the outside, and outside gas enters the compression chamber 641 through the inlet valve 645.

Slide sealing 644 ensures that extension rod 642 slides freely, while maintaining the sealing of compression chamber 641 from outside. Manifold 605 includes intake valves, exhaust valves, fuel injections, ignition plugs.

The length of the connection rod 602 is L, and throw of the crankshaft 603 is R. The length of the connection rod 632 is 1, and the throw of the crankshaft 633 is r.

FIG. 6A shows the auxiliary component 630 in detail. The auxiliary component 630 comprises the auxiliary piston 620, the connection rod 632, the crankshaft 633, the big end bearing 635, and a pin and piston bushing 634.

When main piston 604 is driven by combustion pressure and moves from the TDC to BDC, it compresses the gas contained in the compression chamber 641.

When main piston 604 is driven by crankshaft 603 and moves from the TDC to BDC, it compresses the gas contained in the compression chamber 641, the dynamic energy from crankshaft 603 is converted and stored in the compressed gas.

In the structure of Example 4, the air compression and fuel combustion are independent of each other, the air can be compressed more efficiently, and the dynamic energy of the automobile can be recovered and stored.

Example 5

The key part in Examples 1-4 is how to control the movement of the auxiliary piston, so that the trajectory of the combustion chamber volume V between the main piston and the auxiliary piston forms a plateau wherein the V variation is less than a certain value, and the trajectory of the combustion chamber volume V can form a specific shape, which can achieve a specific tangential force characteristic.

In Example 5, more control methods of the auxiliary piston are provided.

Referring to the definition of 301 and 302 in FIG. 3, assuming piston bore area is =1.

The position trajectory of the main piston is expressed as Tmj in Cartesian coordinate system:

$$Tmj = -\{L - L^* \cos[\arcsin(R/L^* \sin a)]\} - (R - R^* \cos a) - Vc$$

The position trajectory of the auxiliary piston is expressed as Taj in Cartesian coordinate system:

$$Taj = +\{l - l^* \cos[\arcsin(r/l^* \sin ka)]\} - (r - r^* \cos ka)$$

wherein k=W2/W1;

W1 is the rotational angular velocity of the main piston crankshaft;

W2 is the rotational angular velocity of the auxiliary piston crankshaft;

k is an integer of 2, 3, 4, 5, 6, etc.; and a is the crank angle of the main crankshaft.

If a camshaft is used to control the movement of the auxiliary piston, the same results in Examples 1-4 can be achieved.

Figure 6B:
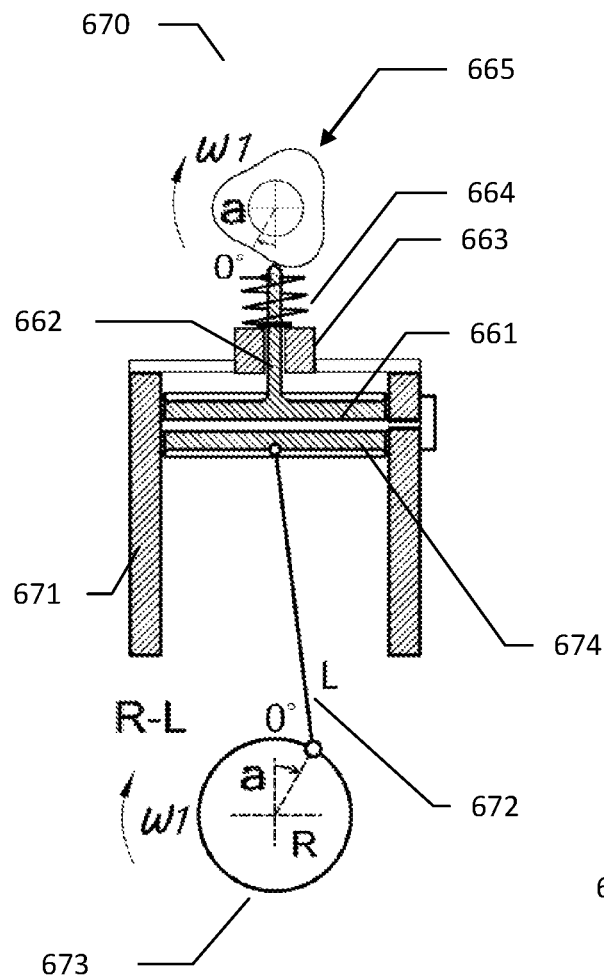
FIG. 6B is an illustration of an embodiment of a piston engine with a camshaft controlled auxiliary piston according to the present invention.
Figure 6C:
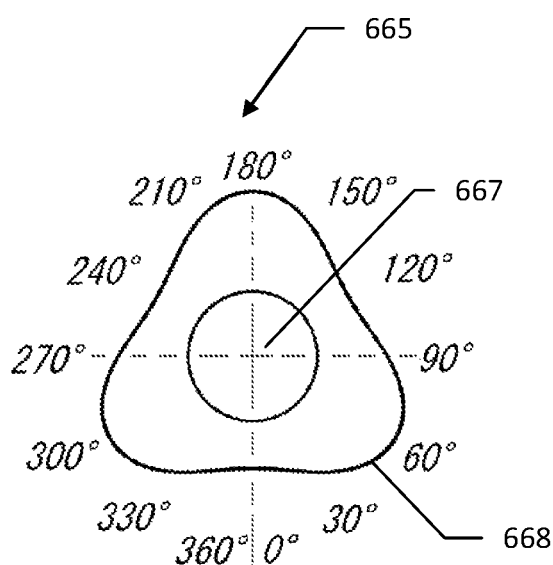
FIG. 6C is an illustration of an embodiment of a camshaft profile according to the present invention.
Figure 6D:
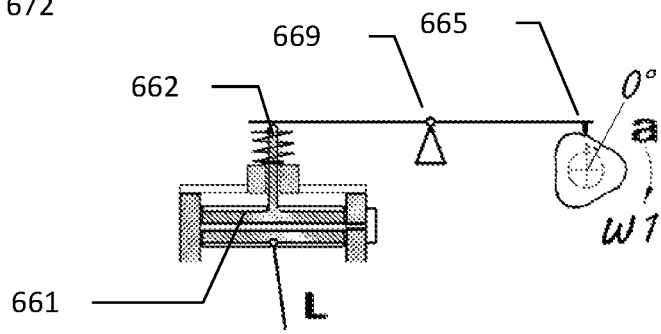
FIG. 6D is an illustration of an embodiment of a camshaft with a lever according to the present invention.

As shown in FIG. 6B, FIG. 6C, and FIG. 6D, if camshaft 665 rotates at the same angular velocity as crankshaft 673, the camshaft profile 668 follows Polar Rc in Polar coordinate system:

$$\text{Polar } Rc = +D/2 - \{l - l^* \cos[\arcsin(r/l^* \sin ka)]\} + (r - r^* \cos ka)$$

where k=2, 3, 4, 5 or 6

When k=3, the combustion chamber volume V in FIG. 6B will have the same trajectory as that of piston engine in FIG. 3.

Referring to FIG. 6B, in the cylinder 671, there are two pistons, i.e., main piston 674 and auxiliary piston 661. The space between main piston 674 and auxiliary piston 661 is combustion chamber volume V.

Auxiliary piston 661 has a pushrod 662, and the pushrod 662 is always in contact with the camshaft 665, or in state of sliding-touched connecting. Spring 664 keeps the auxiliary piston 661 at the uppermost position (as the BDC2 position in FIG. 3) of the cylinder 671 when there is no external force on it. Sliding guard 663 ensures that auxiliary piston 661 and pushrod 662 can move up and down without moving sideways.

Camshaft can also control the auxiliary piston via a lever 669, as shown in FIG. 6D.

When the main piston 674 is at its TDC position, the auxiliary piston 661 is at its BDC2 position (at the uppermost position of cylinder 671), and the space V between the main piston 674 and the auxiliary piston 661 is at its minimum Vc.

The main piston 674 is connected to the crankshaft 673 via the connection rod 672. The crankshaft 673 rotates at the angular velocity W1.

The shaft center of camshaft 665 is 667.

Camshaft 665 has a profile 668, the profile is expressed as Polar Rc in Polar coordinate:

$$\text{Polar } Rc = +D/2 - \{l - l^* \cos[\arcsin(r/l^* \sin ka)]\} + (r - r^* \cos ka)$$

where k=2, 3, 4, 5 or 6 wherein D/2 is the offset of the radius of camshaft 665, D/2 will not change the trajectory of the combustion volume V, D/2 will decide the minimum radius of 668 and the length of the pushrod 662.

There are two combinations of camshaft profiles and angular velocities.

Camshaft 665 can rotate at the same angular direction and velocity W1 of crankshaft 673. The profile of the camshaft in Polar coordinates is expressed as:

$$\text{Polar } Rc = +D/2 - \{l - l^* \cos[\arcsin(r/l^* \sin ka)]\} + (r - r^* \cos ka)$$

Wherein k=2, 3, 4, 5 or 6

Camshaft 665 can also rotate at the same angular direction of crankshaft 673 but at k times the angular velocity W1 of crankshaft 673, wherein k=2, 3, 4, 5 or 6. The profile of the camshaft in Polar coordinates is expressed as:

$$\text{Polar } Rc = +D/2 - \{l - l^* \cos[\arcsin(r/l^* \sin a)]\} + (r - r^* \cos a)$$

In fact, the following two formulas are key relations of main piston and auxiliary piston.

The trajectory of the main piston:

$$Tmj = -\{L - L^* \cos[\arcsin(R/L^* \sin a)]\} - (R - R^* \cos a) - Vc$$

The trajectory of the auxiliary piston:

$$Taj = +\{l - l^* \cos[\arcsin(r/l^* \sin ka)]\} - (r - r^* \cos ka)$$

Many different mechanisms can be used to realize Taj to make the combustion chamber volume V into the desired trajectory or shape.

The choices/calculations of l, r and k are the same as those in Examples 1-4.

Figure 6E:
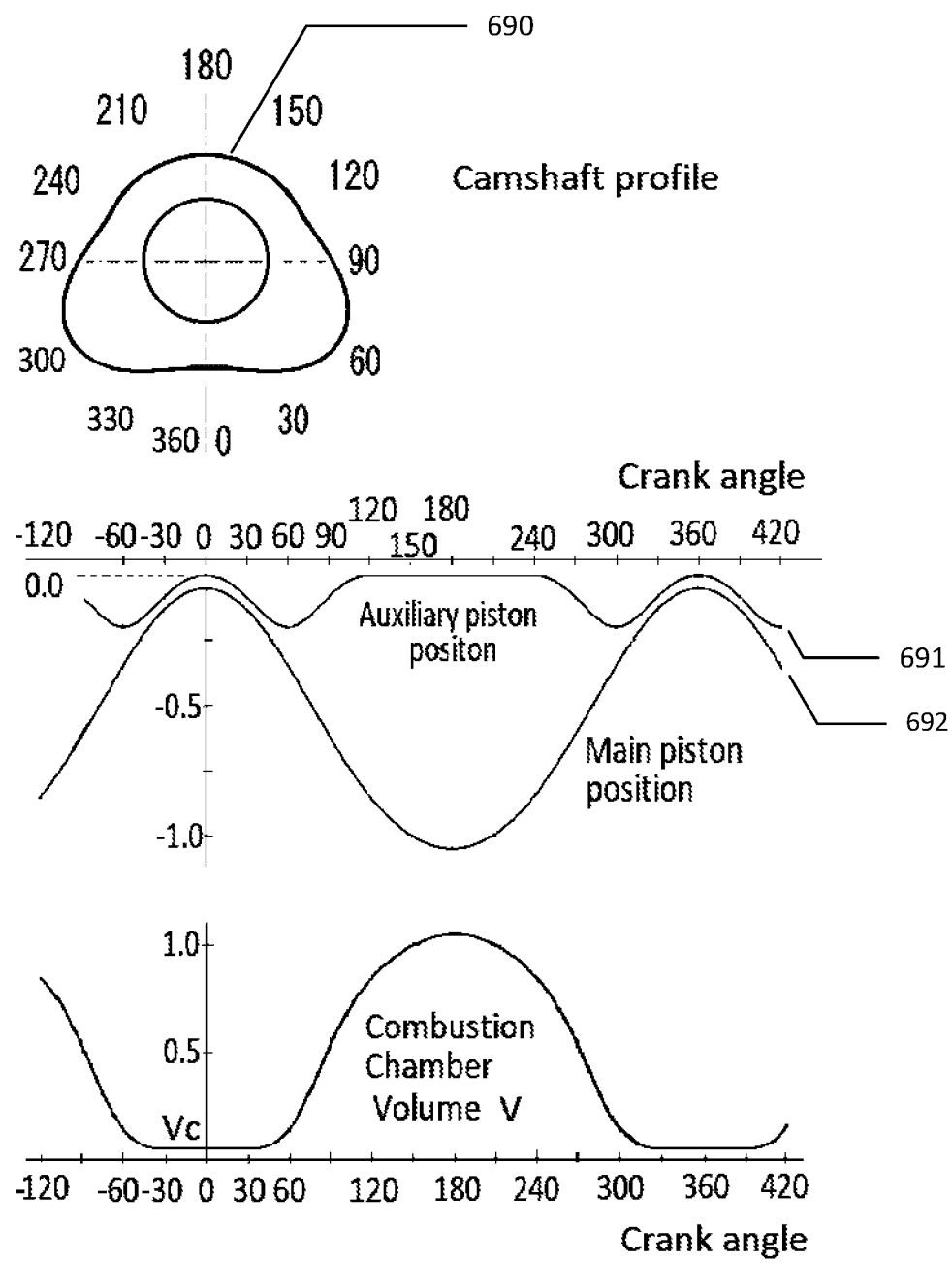
FIG. 6E is an illustration of an embodiment of a camshaft, movement position and combustion chamber volume V according to the present invention.

Camshaft profile 690 in FIG. 6E is another configuration of camshaft, where the camshaft profile has a cut-off from 120° CA-240° AC to keep the combustion volume V unchanged at BDC in referring to prior art engine, instead of a reduced volume at 180° AC as shown in 307 of FIG. 3.

Figure 6F:
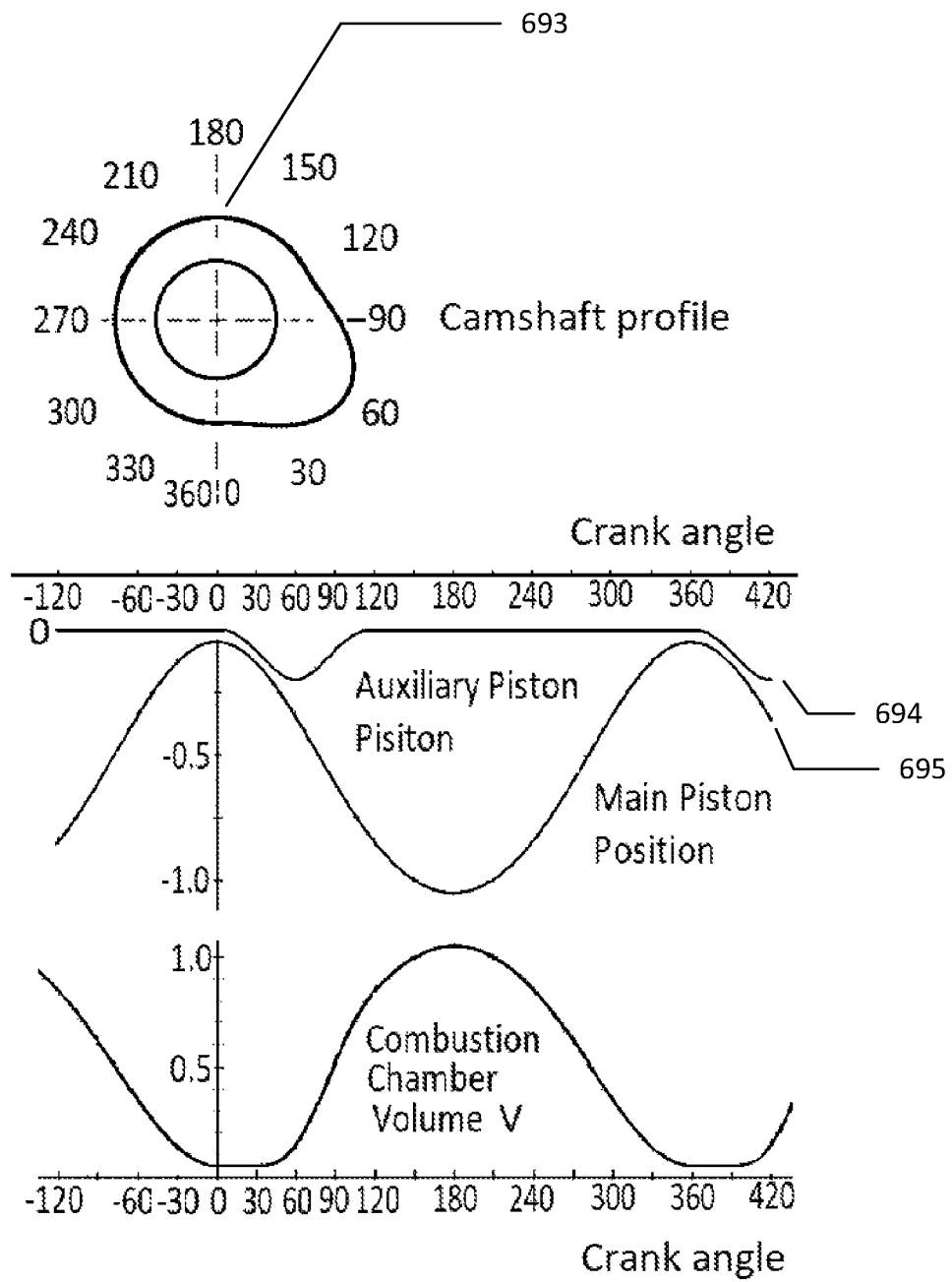
FIG. 6F is an illustration of an embodiment of a camshaft, movement position and asymmetrical combustion chamber volume V according to the present invention.

Camshaft profile 693 in FIG. 6F is another configuration of camshaft, where the camshaft profile has a cut-off from 120° AC to 360° CA to keep the combustion volume V changed from 120 CA to 360 CA in referring to prior art engine, instead of a changed volume V from 120 CA to 360 CA as shown in 307 of FIG. 3.

Profiles 668, 690 and 693 make no difference from 0 CA to 120 CA regarding the Fu characteristics of the engine.

Profiles 668, 690 and 693 are same from 0 CA to 120 CA but different from 120 CA to 360 CA, and have little influences on the Fu characteristics of the engine because most PPP and Fu are occurred/calculated within 0 CA to 120 CA.

The profile of the camshaft 665 can be further simplified as:

$$\text{Polar} Rc = +D/2 + (r - r^* \cos ka)$$

D/2 is the offset of camshaft radius.

In practical applications, there are different L/R configurations, so different l, r and k can be chosen to achieve similar results. The formula Cr, Fu, Tmj and Taj or Polar Rc can be basically used in designs and calculations. Examples 1-5 are only some of the applications.

Different mechanism can be used to control the position or movement of the auxiliary piston, such as an auxiliary crankshaft, camshaft or lobe with different profile, an actuator, a servo motor, etc.

Example 6

In Example 6, there is provided an automobile with direct torque control.

There are certain disadvantages associated with today's automobiles, for example, ordinary gasoline or diesel automobiles are inefficient in fuel, hybrid automobiles are too complicated, and batteries for electric vehicle are expensive and inconvenient to charge.

Example 6 solves the existing problems of automobiles.

This new automobile system has the following characteristics:

1. When in low speed, high torque is available and the torque can be directly controlled. There is no need for a multi-stage transmission gears, only a fixed ratio transmission is sufficient.
2. The engine can be operated in 2-stroke mode, which can reduce the engine block by 50% in volume compared to a 4-stroke engine.
3. The dynamic energy of the automobile during deceleration can be partially recovered and stored in compressed air.
4. Part of the waste energy from the exhaust gas can be recovered and stored in compressed air.
5. Eliminating the torque loss of prior art engine due to advanced ignition, the engine efficiency is further improved.
6. There is no bulky traditional alternator. A small-sized high-frequency generator is used.
7. No starter is required; the stored compressed air is used to start the automobile.
8. No need for bulky crank battery. Only a small battery is needed to power the control system and on-board accessories.
9. Less emission due to more accurate of air/fuel ratio control.

Figure 7:
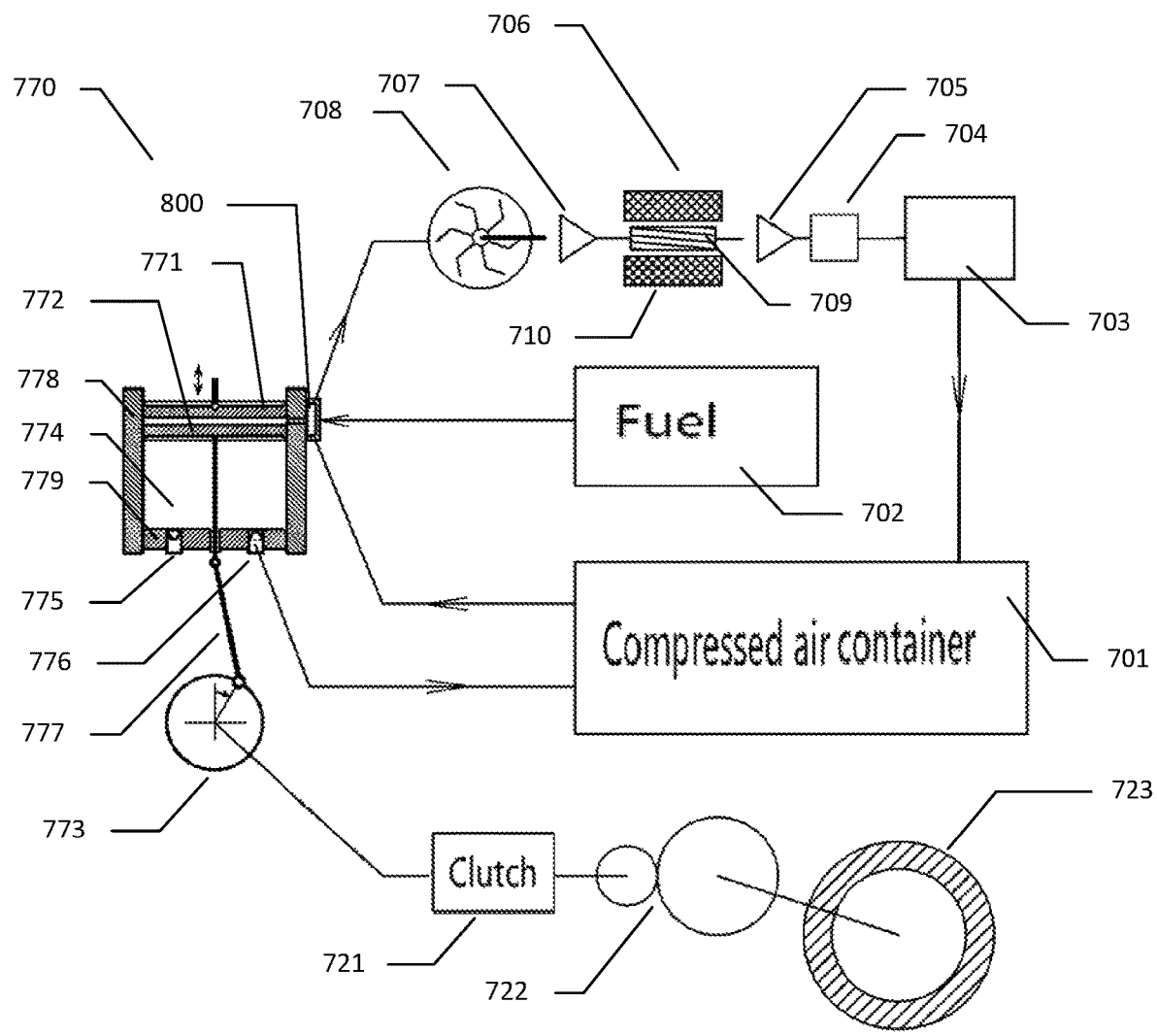
FIG. 7 is an illustration of an automobile system with direct torque control and fixed transmission ratio and waste gas energy recovery according to the present invention.

Referring to FIG. 7, the system comprises piston engine 770. Piston engine 770 has a cylinder 778, and in the cylinder 778 there are main piston 772 and auxiliary piston 771. A space is formed between main piston 772 and auxiliary piston 771 defined as the combustion chamber V.

When main piston 772 is at its TDC position, auxiliary piston 771 is at its BDC2 position, and the combustion chamber V=Vc.

Main piston 772 and its extension rod are connected by a connection rod 777 to a crankshaft 773.

A manifold 800 is connected to the combustion chamber.

Auxiliary piston 771 moves up and down in a specific way, for example, in any of the ways as described in Examples 1 to 5, so that the combustion chamber volume V forms a plateau from 0° TDC to x° ATDC of crank angle. Within the plateau, V=Vc, and the volume change is less than 2/1000 Vd.

Clearance volume Vc can be very small, not limited by fuel type, such as Vc=0.033 Vd, Vc=0.01 Vd.

A compression chamber 774 is formed between the main piston 772 and the lower end cover 779 of the cylinder. When main piston 772 moves from the TDC to BDC, gas contained in the chamber 774 can be compressed into the air container 701.

A generator 706, which includes rotor 709 and stator 710, can be used as electric motor or electric generator.

Exhaust gas discharged from combustion chamber by piston engine 770 drives turbine 708 to rotate, and turbine 708 drives rotor 709 to rotate via clutch 707. Rotor 709 drives reducer gear 704 via clutch 705, and reducer gear 704 drives the auxiliary compressor 703. Auxiliary compressor 703 compresses air and stores the air in air container 701.

When clutch 707 is engaged, turbine 708 pushes rotor 709 to rotate. When clutch 707 is disengaged, turbine 708 and rotor 709 are disconnected.

When clutch 705 is engaged, rotor 709 pushes reducer gear 704 to rotate. When clutch 705 is disengaged, rotor 709 and reducer gear 704 are disconnected.

Auxiliary compressor 703 may be a rotary screw air compressor, a reciprocating compressor or other types of compressor.

The fuel in fuel tank 702 is injected into the combustion chamber of the piston engine 770 together with the compressed air from the air container 701. Main piston 772 is pushed to move downwards during combustion. Piston 772 pushes crankshaft 773 to rotate. Crankshaft 773 pushes the differential gear 722 to rotate via clutch 721, and the differential gear 722 pushes wheels 723 to rotate.

When clutch 721 is disengaged, the crankshaft 773 and the differential gear 722 are disconnected.

Air container 701 needs to be inflated before the initial start. External electric power is required to drive rotor 709 to rotate, and rotor 709 drives auxiliary compressor 703 to work via clutch 705 and reducer gear 704. When the pressure in air container 701 reaches a required value, external power is no longer needed.

If the engine of an automobile has four evenly distributed cylinders, at any moment, no matter where the crankshaft stops, there will be a main piston in the range of 0° ATDC to 90° ATDC.

Simply injecting compressed air into the combustion chamber of this main piston, the compressed air will push the main piston to move, or injecting compressed air and fuel and ignite combustion, crankshaft 773 will rotate and the entire engine will be activated.

After starting up, the working sequence of piston engine 770 is the same as the working sequence described in Example 3 and as shown in curve 533 in FIG. 5D and will not be repeated herein.

The working sequence of compressing air in compression chamber 774 is the same as that described in Example 4 and will not be repeated herein.

When the automobile is slowing down, the fuel supply can be stopped or reduced. The dynamic energy of the automobile drives the main piston 772 via crankshaft 773 to compress the air in the compress chamber 774, so that the dynamic energy of the automobile is stored in the compressed air.

The generator has characteristics as the following:

A VVVF (variable voltage variable frequency) power supply is applied to the stator.

When the frequency of the VVVF power supply is lower than the synchronous frequency of the generator, it is in regenerating mode, the generator partially converts the mechanical energy from the turbine into electrical energy.

When the frequency of the VVVF power supply is higher than the synchronous frequency of the generator, it is in motor mode, the generator converts electrical energy into mechanical energy on the rotor and drives the auxiliary compressor to compress the air and store the air in the air container.

Electrical energy (from onboard batteries) and the mechanical energy from the turbine can be combined at same time via the generator 706 to drive the compressor.

If electric power is needed, apply a VVVF power supply with a frequency lower than the synchronous frequency of the generator to the stator 710, and the stator 710 enters the power generation state.

If no power is needed, the VVVF power supply applied to the stator 710 can be disconnected or apply a VVVF power supply synchronized with the generator, then the stator 710 does not generate electricity.

Turbine 708 can independently drive the auxiliary compressor 703, and the compressed air is stored in the container 701.

Turbine 708 can also drive generator 706 and/or auxiliary compressor 703 at the same time. The energy from turbine 708 is distributed between generator 706 and auxiliary compressor 703. The generator 706 generates electricity while auxiliary compressor 703 compresses air.

Both clutch 707 and clutch 705 are one directional.

The process by which crankshaft 773 drives wheel 723 is described as follows:

When clutch 721 is engaged, crankshaft 773 drives differential gear 722, and differential gear 722 in turn drives wheel 723.

From crankshaft 773 to wheel 723, there is only one fixed gear ratio in driving. Unlike currently existing gasoline and diesel automobiles, a 5- to 10-stage transmission is required.

In order to improve efficiency or increase air pressure, air can be compressed in two stages. The second stage of compression is not shown in FIG. 7. The second stage of compression is a rotary screw air compressor or reciprocating compressor driven by crank shaft 773.

In Example 6, the torque or speed of the automobile can be controlled by controlling the fuel injection. The torque and fuel control are shown in FIG. 5E.

Preferably, the air enters the compression chambers 774 through inlet valves 775 may be natural fresh air, exhaust gas from turbine 708, or air mixed with exhaust gas recirculation (EGR), which is not shown in FIG. 7.

Although the present invention has been described in considerable detail with reference to certain preferred embodiments thereof, other embodiments and modifications are possible. Therefore, the scope of the appended claims should not be limited by the preferred embodiments set forth in the examples, but should be given the broadest interpretation consistent with the description as a whole.

The invention claimed is:

1. A piston engine, comprising:
   a cylinder defining an interior space therein,
   the cylinder encloses a chamber therein, a main piston configured to fit horizontally and sealingly in the cylinder and move up and down along its centerline therewithin, and an auxiliary piston configured to fit sealingly in the cylinder and move up and down along its centerline therewithin,
   the main piston and the auxiliary piston move at different frequencies,
   the enclosed space within the cylinder and between the main piston and the auxiliary piston forms a combustion chamber with volume V,
   the main piston is connected to a first connection rod, the first connection rod is connected to a first crankshaft, the displacement of the main piston is Vd,
   the auxiliary piston is connected to a second connection rod, the second connection rod is connected a second crankshaft,
   wherein the length of the second connection rod is shorter than the length of the first connection rod,
   movement of the auxiliary piston relates to the rotational movement of the first crankshaft, wherein with any position of the first crankshaft, the auxiliary piston is at a corresponding position, the movements of the main piston and the auxiliary piston follow a relationship, rendering the combustion chamber volume V to form a plateau, from 15° BTDC to 15° ATDC with respect to the crank angle of the first crankshaft of the plateau, wherein the variation of the combustion chamber volume V is within 1/100 of Vd, wherein the piston engine has a preferable PPP crank angle, wherein for a given amount of fuel, a maximum torque is obtained when the peak combustion pressure is at the preferable PPP crank angle position.

2. The piston engine according to claim 1, wherein angular velocity of the second crankshaft is an integer multiple of angular velocity of the first crankshaft, wherein integer is 2, 3, 4, 5, or 6, wherein when the main piston is at its top dead center (TDC), the auxiliary piston is at its bottom dead center (BDC2), the combustion chamber volume V is at its minimum volume Vc, wherein from 16° BTDC to 16° ATDC in the crank angle of the first crankshaft of the plateau, the variation of the combustion chamber volume V is within 5/1000 of Vd.

3. The piston engine according to claim 2, wherein the angular velocity of the second crankshaft is twice that of the first crankshaft, wherein the first crankshaft crank throw is R, the second crankshaft crank throw is r, wherein r/R is less than 1/2, wherein from 35° BTDC to 35° ATDC in the crank angle of the first crankshaft of the plateau, the variation of the combustion chamber volume V is within 2/1000 of Vd.

4. The piston engine according to claim 2, wherein the angular velocity of the second crankshaft is three times that of the first crankshaft, wherein the first crankshaft crank throw is R, the second crankshaft crank throw is r, wherein r/R is less than 1/4, wherein from 30° BTDC to 30° ATDC in the crank angle of the first crankshaft of the plateau, the variation of the combustion chamber volume V is within 2/1000 of Vd.

5. The piston engine according to claim 2, wherein the angular velocity of the second crankshaft is four times that of the first crankshaft, wherein the first crankshaft crank throw is R, the second crankshaft crank throw is r, wherein r/R is less than 1/8, wherein from 16° BTDC to 16° ATDC in the crank angle of the first crankshaft of the plateau, the variation of the combustion chamber volume V is within 2/1000 of Vd.

6. The piston engine according to claim 2, further comprising a manifold, wherein when the main piston moves from its BDC to TDC position, air/fuel mixture in the combustion chamber is compressed to form a compressed air/fuel mixture, wherein after the main piston reaches the plateau of the combustion chamber volume V, the compressed air/fuel mixture is ignited, wherein the ignition position is determined by crank angle travelled in the period from start of ignition to peak combustion pressure position minus the preferable PPP crank angle, wherein when the ignition position is negative, it is retarded from the TDC, wherein when the ignition position is positive, it is advanced from the TDC, wherein the air and fuel entering the combustion chamber and ignition are controlled by the manifold.

7. The piston engine according to claim 2, further comprising a manifold, wherein when the main piston moves from its BDC to TDC position, only the air in the combustion chamber is compressed, wherein fuel is injected after the main piston reaches the plateau of the combustion chamber volume V to form a compressed air/fuel mixture, wherein the air/fuel mixture is ignited at the same time the fuel is injected, wherein the ignition position is determined by crank angle travelled in the period from start of ignition to peak combustion pressure position minus the preferable PPP crank angle, wherein when the ignition position is negative, it is retarded from the TDC, wherein when the ignition position is positive, it is advanced from the TDC, wherein the air entering the combustion chamber, the fuel injection and ignition are controlled by the manifold.

8. The piston engine according to claim 2, further comprising a manifold, wherein the piston engine is a two-stroke engine, wherein no air is compressed in the combustion chamber when the main piston moves from its BDC to TDC position, air is pre-compressed and injected into the combustion chamber together with fuel, and ignition is started when the air/fuel injected reaches a certain amount of mass, wherein the air/fuel injection is in advance of the ignition in timing, wherein the ignition position is determined by crank angle travelled in the period from start of ignition to peak combustion pressure position minus the preferable PPP crank angle, wherein when the ignition position is negative, it is retarded from the TDC, wherein when the ignition position is positive, it is advanced from the TDC, wherein the air/fuel injection and ignition are controlled by the manifold.

9. A piston engine, comprising:

a cylinder defining an interior space therein, the cylinder encloses a chamber therein, a main piston configured to fit sealingly in the cylinder and move up and down along its centerline therewithin, and an auxiliary piston configured to fit sealingly in the cylinder and move up and down along its centerline therewithin, the main piston and the auxiliary piston move at different frequencies, the main piston is connected to a first connection rod, the first connection rod is connected to a first crankshaft, the main piston has a displacement volume Vd, the length of the first connection rode is L, the throw of the first crank shaft is R, movement of the auxiliary piston is controlled by a mechanical part connected to the auxiliary piston, the auxiliary piston moves at k times the frequency of the main piston movement, in each rotation of the first crankshaft, the enclosed space within the cylinder and between the main piston and the auxiliary piston forms a combustion chamber with volume V, wherein V depends on the positions of the main piston and the auxiliary piston, the combustion chamber volume V is a function of the position of the auxiliary piston and the crank angle of the first crankshaft, wherein the combustion chamber volume V forms a plateau, from 0° BTDC to 17° ATDC in crank angle of the first crankshaft of the plateau, wherein the variation of the combustion chamber volume V is less than 5/1000 of Vd, wherein the piston engine has a preferable PPP crank angle, wherein for a given amount of fuel, a maximum torque can be obtained when the peak combustion pressure is at the preferable PPP crank angle position.

10. The piston engine according to claim 9,
wherein from 0° CA to 360/k ° CA of each rotation of the first crankshaft, the position of the auxiliary piston along the centerline of its cylinder is expressed as Taj:

$$Taj=+\{l-l^*\cos[\arcsin(r/l^*\sin ka)]\}-(r-r^*\cos ka)$$

wherein:
k is 2, 3, 4, or 5,
a is the crank angle of the first crankshaft,
l=0.10 L to 0.40 L,
r=0.06 R to 0.41 R,
Taj=0 is the bottom dead center of the auxiliary piston, or BCD2.

11. The piston engine according to claim 9,
wherein each rotation of the first crankshaft, the position of the auxiliary piston along the centerline of its cylinder is expressed as Taj:

$$Taj=+\{l-l^*\cos[\arcsin(r/l^*\sin ka)]\}-(r-r^*\cos ka)$$

wherein:
k is 2, 3, 4, or 5,
a is the crank angle of the first crankshaft,
l=0.10 L to 0.40 L,
r=0.06 R to 0.41 R,
Taj=0 is the bottom dead center of the auxiliary piston, or BCD2.

12. The piston engine according to claim 9, wherein the mechanical part is a camshaft,
wherein the auxiliary piston has a pushrod fixed on top side of the auxiliary piston, and the pushrod is in sliding-touch with the camshaft and controlled by rotation of the camshaft,
the camshaft rotates at the same angular velocity of the first crankshaft,
wherein the camshaft has a profile, the Polar coordinates of the profile are expressed as:

$$\text{Polar } Rc=+D/2-\{l-l^*\cos[\arcsin(r/l^*\sin ka)]\}+(r-r^*\cos ka)$$

wherein:
k is 2, 3, 4, or 5,
l=0.10 L to 0.40 L,
r=0.06 R to 0.41 R,
D is an offset of the diameter of the camshaft,
D>0.4 R,
a is the crank angle of the first crankshaft.

13. The piston engine according to claim 9,
wherein the mechanical part is a camshaft,
wherein the auxiliary piston has a pushrod fixed on the top side of the auxiliary piston, and the pushrod is in sliding-touched with the camshaft and controlled by the rotation of the camshaft,
the camshaft rotates at k times angular velocity of the first crankshaft, wherein k=2, 3, 4, or 5,
wherein the camshaft has a profile, the Polar coordinates of the profile are expressed as:

$$\text{Polar } Rc=+D/2-\{l-l^*\cos[\arcsin(r/l^*\sin ka)]\}+(r-r^*\cos ka)$$

wherein:
l=0.10 L to 0.40 L,
r=0.06 R to 0.41 R,
D is an offset of the diameter of the camshaft,
D>0.4 R,
a is the crank angle of the first crankshaft.

14. The piston engine according to claim 9, wherein the mechanical part is a camshaft,
wherein the auxiliary piston has a pushrod fixed on the top side of the auxiliary piston, and the pushrod is in sliding-touched with the camshaft and controlled by the rotation of the camshaft,
the camshaft rotates at the same angular velocity of the first crankshaft,
wherein the camshaft has a profile, the Polar coordinates of the profile are expressed as:

$$\text{Polar} Rc=+D/2+(r-r^*\cos ka)$$

wherein:
k is 2, 3, 4 or 5,
r=0.06 R to 0.41 R,
D is an offset of the diameter of the camshaft,
D>0.4 R,
a is the crank angle of the first crankshaft.

15. The piston engine according to claim 9, further comprising a manifold,
wherein when the main piston moves from its BDC to TDC position, only air in the combustion chamber is compressed and fuel is injected after the main piston reaches the plateau of the combustion chamber volume V to form an air/fuel mixture,
wherein the air/fuel mixture is ignited at the same time as when the fuel is injected,
wherein the ignition position is determined by crank angle travelled in the period from start of ignition to peak combustion pressure position minus the preferable PPP crank angle,
wherein when the ignition position is negative, it is retarded from the TDC,
wherein when the ignition position is positive, it is advanced from the TDC,
wherein the air entering the combustion chamber, fuel injection and ignition are controlled by the manifold.

16. The piston engine according to claim 9, further comprises a manifold,
wherein the piston engine is a two-stroke engine and no air is compressed in the combustion chamber when the main piston moves from its BDC to TDC position,
wherein air is pre-compressed and injected into the combustion chamber with fuel,
wherein ignition is started when the air/fuel injected reaches a certain amount of mass,
wherein the air/fuel injection is in advance of the ignition in timing,
wherein the ignition position is determined by crank angle travelled in the period from start of ignition to peak combustion pressure position minus the preferable PPP crank angle,
wherein when the ignition position is negative, it is retarded from the TDC, wherein when the ignition position is positive, it is advanced from the TDC, wherein air/fuel injection and ignition are controlled by the manifold.

17. An automobile with direct torque control, (a) the automobile comprises a piston engine, the torque control and/or speed control of the automobile is achieved with fixed ratio transmission and fuel supply, wherein the piston engine comprises:

a cylinder defining an interior space therein, the cylinder encloses a chamber therein, a main piston configured to fit sealingly in the cylinder and move up and down along its centerline therewithin, and an auxiliary piston configured to fit sealingly in the cylinder and move up and down along its centerline therewithin, the enclosed space within the cylinder and between the main piston and the auxiliary piston forms a combustion chamber with volume V, the main piston is connected to an extension rod, the extension rod is connected to a connection rod, and the connection rod is connected to a first crankshaft, the main piston has a displacement Vd, wherein from 0° CA to 360/k ° CA of each rotation of the first crankshaft, the frequency spectrum of the auxiliary piston motion is k times of the frequency spectrum of the main piston motion, and k=2, 3, 4, 5, or 6, the combustion chamber volume V has a plateau, from 0° ATDC to 30° ATDC in crank angle of the first crankshaft, wherein the variation of the combustion chamber volume V is less than 5/1000 of Vd, wherein when the main piston is at its TDC, the auxiliary piston is at its bottom dead center BDC2, (b) the automobile further comprises an air container to store compressed air, (c) a compression chamber is formed between the main piston and the lower end cover of its cylinder, said lower end cover has an inlet valve and an outlet valve, the compression chamber is used to compress air and/or convert dynamic energy from the first crankshaft into compressed air, wherein the dynamic energy of the automobile is recovered and then stored in the compressed air in the compression chamber through movement of the main piston, when the main piston moves from the TDC to the BDC driven by combustion pressure, the inlet valve is closed and the outlet valve is opened, the compression chamber compresses the air contained and injects the air into the air container through the outlet valve, when the main piston moves from TDC to BDC driven by the first crankshaft, the inlet valve is closed and the outlet valve is opened, the compression chamber compresses the air contained and injects the air into the air container through the outlet valve, and the dynamic energy of the automobile is converted and stored in the compressed air through rotation of the first crankshaft, when the inlet valve is opened, the combustion chamber is connected with outside air, and there is no air compression and no dynamic energy recovery, (d) the automobile comprises a first clutch, wherein the first crank shaft pushes a differential gear to rotate through the first clutch, and the differential gear pushes a wheel to rotate, wherein from the first crankshaft to the wheel, gear ratio is fixed and the torque on the first crank shaft is applied to the wheel through a fixed ratio.

18. The automobile according to claim 17, said automobile comprises a turbine, a generator, and an auxiliary compressor, the generator further comprises a rotor and a stator, a reducer gear, a second clutch, a third clutch, wherein exhaust gas from the combustion chamber drives the turbine to rotate at a highspeed, the turbine drives the rotor through the second clutch, the rotor drives the reducer gear boxthrough the third clutch and the reducer gear box drives the auxiliary compressor to move, the auxiliary compressor compresses the air and stores the air in the air storage container to partially recover the energy in the exhaust gas, wherein when the second clutch is engaged, the turbine pushes the rotor to move, when the second clutch is disengaged, the turbine and the rotor are disconnected, wherein when the third clutch is engaged, the rotor pushes the reducer gear box, when the third clutch is disengaged, the rotor and the reducer gear box are disconnected, wherein when the second clutch is engaged, the rotor rotates at the same speed as the turbine, wherein a variable voltage variable frequency VVVF power supply is applied to the stator, when the frequency of the VVVF power supply is lower than the synchronous frequency of the generator based on the rotation speed of the rotor, the generator partially converts the energy from the turbine into electrical energy, when the frequency of the VVVF power supply is higher than the synchronous frequency of the generator based on the rotation speed of the rotor, the generator converts electrical energy from the VVVF power supply into mechanical energy onto the rotor and drives the auxiliary compressor to compress the air and store the air in the air container, wherein the electrical energy from the VVVF power supply and the mechanical energy from the turbine are combined onto the rotor when the second clutch is engaged.

* * * * *